US012277509B2

(12) United States Patent
Vick et al.

(10) Patent No.: US 12,277,509 B2
(45) Date of Patent: *Apr. 15, 2025

(54) PROJECTING DATA TRENDS USING CUSTOMIZED MODELING

(71) Applicant: ICE Benchmark Administration Limited, London (GB)

(72) Inventors: Emma Nicolette Vick, Middlesex (GB); Andrew John Hill, Hertfordshire (GB); Gary David Hooper, Kent (GB); Paul Anderson Rhodes, London (GB); Timothy Joseph Bowler, London (GB); Charles Abboud, London (GB); Stelios Etienne Tselikas, St. Albans (GB); Thomas Evans, Surrey (GB)

(73) Assignee: ICE Benchmark Administration Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,769

(22) Filed: Sep. 23, 2024

(65) Prior Publication Data
US 2025/0013897 A1   Jan. 9, 2025

Related U.S. Application Data

(63) Continuation of application No. 18/656,636, filed on May 7, 2024, now Pat. No. 12,131,268, which is a continuation of application No. 18/454,907, filed on Aug. 24, 2023, now Pat. No. 12,014,290, which is a continuation of application No. 17/210,132, filed on
(Continued)

(51) Int. Cl.
*G06N 5/046* (2023.01)
*G06Q 10/04* (2023.01)

(52) U.S. Cl.
CPC ............ *G06N 5/046* (2013.01); *G06Q 10/04* (2013.01)

(58) Field of Classification Search
CPC .............................. G06N 5/046; G06Q 10/04
See application file for complete search history.

(56) References Cited

U.S. PATENT DOCUMENTS 7,747,480 B1   6/2010 Agresta et al.
7,844,526 B1   11/2010 Redweik
(Continued)

OTHER PUBLICATIONS

Lloyd, Simon P., Estimating Nominal Interest Rate Expectations: Overnight Indexed Swap and the Term Structure, Feb. 15, 2018.

*Primary Examiner* — Mohamed Abou El Seoud
*Assistant Examiner* — Robert Bejcek, II
(74) *Attorney, Agent, or Firm* — DLA Piper LLP (US)

(57) ABSTRACT

Systems and methods for projecting one or more trends in electronic data and generating enhanced data. A system includes a data forecasting system is in electronic communication with one or more electronic data sources via an electronic network. The data forecasting system is configured to: monitor the electronic data source(s) for data that meet one or more predetermined criteria; obtain at least a portion of the monitored data from electronic data source(s) based on the predetermined criteria; create a data set from the obtained data; derive one or more data values associated with the data set over a predetermined period according to a forward-looking term methodology; and utilize the data set and the derived value(s) over the predetermined period to derive at least one data forecast metric associated with the data set.

12 Claims, 12 Drawing Sheets

Related U.S. Application Data

Mar. 23, 2021, now Pat. No. 11,783,213, which is a continuation of application No. 17/128,429, filed on Dec. 21, 2020, now Pat. No. 10,990,886, which is a continuation of application No. 16/662,173, filed on Oct. 24, 2019, now Pat. No. 10,891,551.

(60) Provisional application No. 62/752,732, filed on Oct. 30, 2018.

(56) References Cited

U.S. PATENT DOCUMENTS

| | | |
|---|---|---|
| 10,896,048 B1 | 1/2021 | Markson et al. |
| 2002/0065752 A1 | 5/2002 | Lewis |
| 2002/0106709 A1 | 8/2002 | Potts et al. |
| 2003/0046130 A1 | 3/2003 | Golightly et al. |
| 2004/0199451 A1 | 10/2004 | Benning et al. |
| 2010/0241590 A1 | 9/2010 | Moore |
| 2017/0178416 A1 | 6/2017 | Barreira et al. |
| 2018/0011952 A1 | 1/2018 | Murphy et al. |

REPORT CENTER

WELCOME TO THE REPORT CENTER

TO VIEW ALL REPORT CATEGORIES OR RECENTLY VIEWED REPORTS, PLEASE SCROLL DOWN.

END OF DAY REPORT PACKAGES IN .csv FORMAT AND NATIONAL GAS EXCHANGE INDICES ARE AVAILABLE FOR PURCHASE ON A SUBSCRIPTION BASIS. VIEW CONTENT >

| REPORTS ⌄ | ICE TERM RFR PORTAL |
|---|---|

CATEGORY: TERM RFR PORTAL    MARKET: BENCHMARK ADMINISTRATION

REPORT DATE — 902    📄 EXPORT TO EXCEL   SHOW METHODOLOGY
09-OCT-2018

[SUBMIT] — 904

TERM RISK FREE RATES (RFR) PORTAL

09-OCT-2018

| CURRENCY | RFR BENCHMARK | LAST SETTING (%) | PUBLICATION DATE | PUBLICATION TIME (LONDON TIME) |
|---|---|---|---|---|
| GBP | SONIA | 0.7021 | 09-OCT-18 | 09:00 |
| USD | SOFR | 2.1600 | 09-OCT-18 | 13:00 |
| JPY | TONA | -0.0510 | 09-OCT-18 | 02:00 |
| BUR | ESTER | – | – | – |

GBP

| TERM | TERM RFR - REALISED | | TERM RFR - FORWARD LOOKING | |
|---|---|---|---|---|
| | AVERAGE (%) | COMPOUNDED (%) | FUTURES DERIVED (%) | SWAPS DERIVED (%) |
| 1 MONTH | 0.7007 | 0.7009 | 0.7023 | – |
| 3 MONTHS | 0.6373 | 0.6378 | 0.7084 | – |
| 6 MONTHS | 0.5464 | 0.5471 | 0.7446 | – |
| LAST PUBLISHED (LONDON TIME) | 09-OCT-18 11:56 | 09-OCT-18 11:56 | 09-OCT-18 11:56 | – |

USD

| TERM | TERM RFR - REALISED | | TERM RFR - FORWARD LOOKING | |
|---|---|---|---|---|
| | AVERAGE (%) | COMPOUNDED (%) | FUTURES DERIVED (%) | SWAPS DERIVED (%) |
| 1 MONTH | 2.0448 | 2.0464 | – | – |
| 3 MONTHS | 1.9539 | 1.9587 | – | – |
| 6 MONTHS | 1.8729 | 1.8817 | – | – |
| LAST PUBLISHED (LONDON TIME) | 09-OCT-18 16:16 | 09-OCT-18 116:16 | – | – |

JPY

| TERM | TERM RFR - REALISED | | TERM RFR - FORWARD LOOKING | |
|---|---|---|---|---|
| | AVERAGE (%) | COMPOUNDED (%) | FUTURES DERIVED (%) | SWAPS DERIVED (%) |
| 1 MONTH | -0.0600 | -0.0600 | – | – |
| 3 MONTHS | -0.0614 | -0.0614 | – | – |
| 6 MONTHS | -0.0635 | -0.0635 | – | – |
| LAST PUBLISHED (LONDON TIME) | 09-OCT-18 16:16 | 09-OCT-18 116:16 | – | – |

EUR

| TERM | TERM RFR - REALISED | | TERM RFR - FORWARD LOOKING | |
|---|---|---|---|---|
| | AVERAGE (%) | COMPOUNDED (%) | FUTURES DERIVED (%) | SWAPS DERIVED (%) |
| 1 MONTH | – | – | – | – |
| 3 MONTHS | – | – | – | – |
| 6 MONTHS | – | – | – | – |
| LAST PUBLISHED (LONDON TIME) | – | – | – | – |

FIG. 9B

PROJECTING DATA TRENDS USING CUSTOMIZED MODELING

TECHNICAL FIELD

The present disclosure generally relates to improving data structure management and, in particular, to data structure management systems and methods for projecting data trends.

BACKGROUND

Problems exist in the field of electronic data conversion, data projection and data distribution. Users of products, systems, processes or instruments which seek to represent, reflect or measure underlying data types/data sets that are complex or are difficult to analyze, or data types/data sets with sparse underlying electronic data, or data types/data sets with underlying data that are difficult to access or analyze often seek additional information in order to analyze, project forward or otherwise utilize these data types/data sets. One use of electronic data (e.g., input data) is in the creation of data metrics (or other statistical analyses/applications) for those data types/data sets that are complex or difficult to analyze, having sparse underlying electronic data or with underlying data that are difficult to access or analyze. Because the underlying electronic data is sparse, or difficult to access, or because the underlying data is complex or difficult to analyze, it may be difficult to generate accurate data metrics, including projecting data trends (e.g., data forecasting). In the absence of sufficient data and information, and the correct analysis and processing, conventional metrics (based on the sparse data and information) are often inaccurate and unreliable, or no appropriate conventional metric may exist. Accordingly, there is a need for improved data conversion and distribution systems which are able to generate accurate metrics, even if the underlying data being used is sparse or difficult to access or analyze, or if the data types/data sets being measured are complex or are difficult to analyze.

SUMMARY

Aspects of the present disclosure relate to systems and methods for projecting one or more trends in electronic data and generating enhanced data. A system includes a data forecasting system in electronic communication with one or more electronic data sources via an electronic network. The data forecasting system includes non-transitory memory storing computer readable instructions and at least one processor configured to execute the computer readable instructions. The data forecasting system is configured to: monitor the one or more electronic data sources for data that meet one or more predetermined criteria; obtain at least a portion of the monitored data from among the one or more electronic data sources based on the one or more predetermined criteria; create a data set from the obtained data; derive one or more data values associated with the data set over a predetermined period according to a forward-looking methodology; and utilize the data set and the one or more derived data values over the predetermined period to derive at least one data forecast metric associated with the data set.

BRIEF DESCRIPTION OF DRAWINGS

FIGS. 9A and 9B are a schematic representation of an example dedicated website portal used in connection with an aspect of the present disclosure.

DETAILED DESCRIPTION

Aspects of the present disclosure relate to data structure management systems and methods for projecting data trends (e.g., data metrics) and/or isolating and converting the underlying data into data metrics, such as one or more forward-looking term interest rates. The data structure management systems and methods of the present disclosure may isolate, monitor and/or verify data from among one or more data sources, and convert the verified data into one or more data metrics and/or data trend projections such as, without being limited to, one or more forward-looking term interest rates. Systems and methods of the present disclosure are operationally efficient (by isolating, analyzing and appropriately processing only the verified data) and may result in the creation of more accurate data trend projections (through analysis of only the verified/monitored data).

Moreover, the data structure management systems provide technical improvements over conventional systems and techniques. This is because the data structure management systems of the present disclosure include an unconventional data forecasting technique that includes obtaining verified data from among one or more networked data sources and projecting the obtained data into forward-looking term interest rate(s) through a unique data trend projection algorithm. The unconventional technique is able to create accurate data trend projections even when the data sources provide sparse data, where the data is difficult to access or analyze, or where the trend projection is complex or difficult to analyze. The ability to create accurate data trend projections (even with sparse data or data that is difficult to access or analyze) does not exist in conventional systems/techniques and, thus, conventional systems/techniques may produce inaccurate and unreliable or inappropriate data forecasts.

Figure 1:
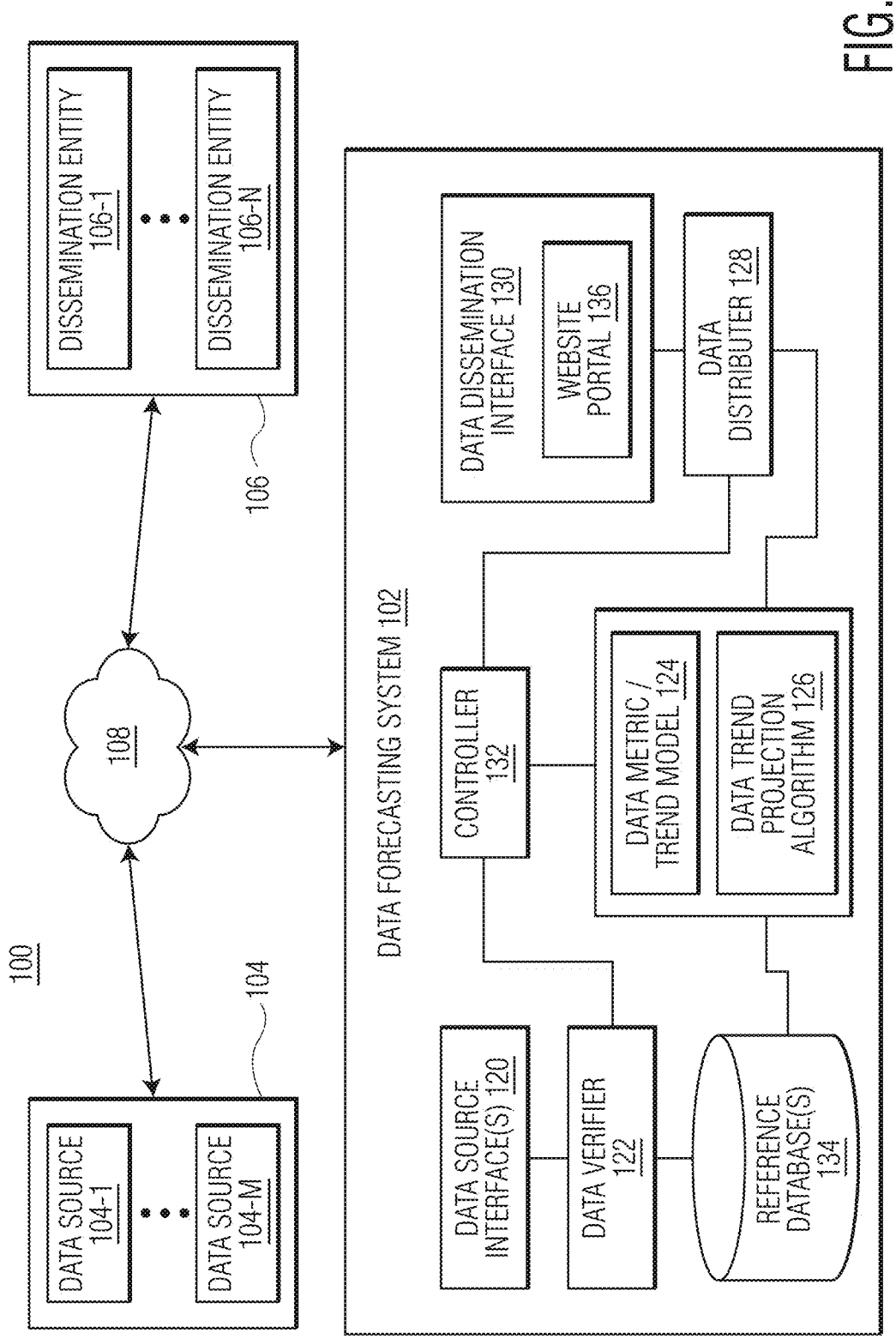
FIG. 1 is a functional block diagram of an example data structure management environment for projecting data trends, according to an aspect of the present disclosure.

Turning now to FIG. 1, a functional block diagram of an example data structure management environment 100 for projecting data trends, according to aspects of the present disclosure, is shown. Environment 100 may include data forecasting system 102 (also referred to herein as DF system 102), one or more data sources 104-1, . . . , 104-M (designated generally as data source(s) 104, where M is greater than or equal to 1) and one or more dissemination entities 106-1, . . . , 106-N (designated generally as dissemination entity(s) 106, where N is greater than or equal to 1, and where M may or not be equal to N). DF system 102, data source(s) 104 and dissemination entity(s) 106 may be communicatively coupled via one or more communication networks 108. The one or more networks 108 may include, for example, a private network (e.g., a local area network (LAN), a wide area network (WAN), intranet, etc.) and/or a public network (e.g., the Internet).

In general, DF system 102 may be configured to communicate with data source(s) 104, obtain verified (e.g., accurate) data among data pushed and/or pulled from data source(s) 104 (e.g., input data) and convert the input data into metric data and/or create forecasted data (e.g., one or more projected data trends) from among the verified data. DF system 102 may also be configured to communicate with and distribute input data, verified data, metric data and/or forecasted data among dissemination entity(s) 106. In some examples, DF system 102 may be configured to format, filter, aggregate and/or normalize data that is disseminated to dissemination entity(s) 106.

In some examples, DF system 102 may include one or more techniques (such as data trend projection algorithm 126) for handling data sets (including sparse data sets, or data that is difficult to access or analyze) among data source(s) 104. In some, non-limiting examples, data source (s) 104 may represent sources of financial and interest rate data, and the forecasted data may include one or more forward-looking term interest rates created from the financial and interest rate data. In some non-limiting examples, input data may include risk free rate data and futures contract data, and the metric and/or forecasted data to be determined may include expected future risk free rates over one or more specified tenor periods. In some non-limiting examples, input data may include overnight index swap data and/or futures contract data. It may be appreciated that the techniques described herein for projecting data trends may be applied to data classes associated with other technical fields aside from electronic or financial markets, such as, without being limited to, cancer research, seismic activity analysis, climate modeling, etc. In general, although DF system 102 is described in some examples below with respect to data classes associated with electronic transactional data, DF system 102 may be used with any electronic data classes associated with any type of electronic data, including those having sparse data. Examples of such data classes may include, for example, traffic data, population data, voting tendency data, and any other class of data where continuous or complete data may not always be available.

In general, data source(s) 104 may comprise a server computer, a desktop computer, a laptop, a smartphone, tablet, or any other computing device known in the art configured to capture, receive, store and/or disseminate any suitable data associated with one or more data classes. In one non-limiting example, one or more of data source(s) 104 may include sources of electronic financial data. In some examples, data sources 104 may be selected based on their perceived relevance to the data class and/or usefulness in the determination of data metrics and/or projected trends.

In general, dissemination entity(s) 106 may comprise a server computer, a desktop computer, a laptop, a smartphone, tablet, or any other computing device known in the art configured to capture, receive, store and/or disseminate any suitable data. In some examples, one or more user devices (not shown) may be configured to communicate with one or more among dissemination entity(s) 106. In some examples, one or more of dissemination entity(s) 106 may include a user device. For example, the user device may receive disseminated data directly from DF system 102 (such as via website portal 136).

In one non-limiting example, dissemination entity(s) 106 may include one or more redistribution platforms (e.g., Bloomberg, Refinitiv) for disseminating electronic data (e.g., transactional data). In some examples, dissemination entity(s) 106 may include one or more websites published on at least one web server. In one example, the disseminated data (via dissemination entity(s) 106 and/or website portal 136) may be used, for example, by data managers, data analysts, regulatory compliance teams, and the like.

In one non-limiting example, data source(s) 104 may include one or more data sources configured to provide (e.g., via push and/or pull techniques) data to DF system 102 including risk free interest rate data (e.g., data source 104-1), futures price data (e.g., data source 104-2), business day calendar information (e.g., data source 104-3), and calendar information regarding one or more scheduled central bank meeting dates (e.g., data source 104-4). Other examples may include overnight index swap trading data (not shown), futures trading data (not shown), and/or any other suitable data. In this example, the input data from among data sources 104-1, 104-2, 104-3, 104-4 may be associated with one or more currencies (e.g., British pound sterling (GBP), US dollar (USD), Swiss franc (CHF), European Union euro (EUR), Japanese yen (JPY), etc.).

For example, data source 104-1 may provide risk free interest rate data, including a rate associated with the particular day (of the submitted data). In some examples, DF system 102 (e.g., via data verifier 122) may obtain the risk free interest rate data through one or more live feeds. In some examples, DF system 102 may obtain the risk free rate data through one or more file transfers. In some examples, the file transfer may include a secure file transfer. In some examples, the risk free rate data may be obtained from a relevant administrator of data source 104-1. In some examples, the risk free rate data may be obtained from a redistributor of data source 104-1.

In some examples, data verifier 122 may apply one or more verification criteria to the risk free interest rate data obtained from data source 104-1. The verification criteria may include, for example, corroborative data source checks, date checks, holiday calendar checks, price variation checks and/or rate error checks. In some examples, data verifier 122 may verify whether the obtained data meets the verification criteria upon submission to DF system 102. When the obtained data meets the verification criteria, data verifier 122 may permit the data from data source 104-1 to be processed by DF system 102. When the obtained data does not meet the verification criteria, in some examples, data verifier 122 may permit the data from data source 104-1 to be discarded by DF system 102. In some examples, the verification criteria for data from data source 104-1 may be determined by an administrator of DF system 102.

Data source 104-2 may provide futures price data. In some examples, data source 104-2 may include one or more electronic exchanges or one or more other electronic trading venues or one or more trade repositories that may obtain, store and/or publish futures price data. In some examples, DF system 102 (e.g., data verifier 122) may obtain the futures price data from data source 104-2 through one or more live data feeds and/or one or more file transfers. In some examples, the file transfer may include a secure file transfer. In some examples, the data from data source 104-2 may represent futures settlement price data for a previous day. In some examples, the data from data source 104-2 may represent futures price data for a same day transaction or quote data, for example, from one or more electronic exchanges or at least one other electronic trading venue or at least one trade repository.

In some examples, data verifier 122 may apply one or more verification criteria to the futures price data obtained from data source 104-2. The verification criteria may include, for example, corroborative data source checks, product checks, date checks, maturity checks, holiday calendar checks, price variation checks and/or price error checks. In some examples, data verifier 122 may verify whether the obtained data meets the verification criteria upon submission to DF system 102. When the obtained data meets the verification criteria, data verifier 122 may permit the data from data source 104-2 to be processed by DF system 102. When the obtained data does not meet the verification criteria, in some examples, data verifier 122 may permit the data from data source 104-2 to be discarded by DF system 102. In some examples, the verification criteria for data from data source 104-2 may be determined by an administrator of DF system 102. In this manner, data verifier 122 may ensure that only pertinent data and information is used in the metric and data trend projection calculations, thereby improving the accuracy of any resulting calculations while at the same time reducing the amount of data and information that must be modeled (e.g., run through data trend projection algorithm 126 that executes the data forecasting calculations), thereby preserving system resources. In some examples, data verifier 122 may obtain verified data from among data source(s) 104, may verify data once obtained from data source(s) 104 and/or may perform any combination thereof.

Data source 104-3 may include one or more suitable data providers of information regarding one or more business day calendars (e.g., a business day calendar for the United States, a business day calendar for the United Kingdom, etc.). Data source 104-4 may include one or more suitable data providers of information regarding at least one calendar of scheduled central bank meeting dates (e.g., for the United Kingdom, etc.).

Data source(s) 104 may include additional electronic data and/or other information useful for supplementing and/or generating data forecasts for sparse electronic data sets (e.g., data sets that are incomplete, have corrupt data, inherently only include a limited amount of data, etc.). The electronic data and/or information may include suitable real-time data and/or archived data which may be related to a data class having sparse data and which may be useful for determining data metrics and data trend projections for the data class. Data source(s) 104 may include internal and/or external data sources which may provide the real-time and/or archived data. Internal data sources may include, for example, data sources that are a part of the particular entity or system seeking to supplement and/or generate data forecasts for a data class (having a limited amount of data points) that pertains to that particular entity/system. External data sources may include, for example, sources of data and information other than the entity or system that is seeking to supplement and/or generate the data forecasts. Data source(s) 104 may also include automated data disseminators, data streams (e.g., constant or intermittent), data aggregators (e.g., that may store information and data related to multiple data classes and which data/information may be obtained from a plurality of other internal and/or external data sources), etc. In some examples, data source(s) 104 may include news and media outlets, electronic exchanges, financial market participants, regulators' systems, etc. Data source(s) 104 may contain information related to domestic and foreign products and/or services.

Each of data source(s) 104 may generate electronic data which may, in some examples, include electronic data files. The electronic data may include additional data and information pertinent to sparse electronic data (e.g., may be useful for generating data metrics and/or data trend projections). Notably, any type of data may be included in the generated electronic data, depending on the particular industry and/or implementation of data forecasting system 102 of the present disclosure. In one example, the electronic data may be produced by data source(s) 104 at a predetermined event or time (e.g., an end of a business day). Alternatively, the electronic data may be produced periodically (e.g., on an hourly or weekly basis), or ad hoc at any other desired time interval.

In some examples, one or more among data source(s) 104 may push electronic data to DF system 102 (e.g., via a server push type of network communication) without receiving any request from DF system 102. For example, data source(s) 104 may push data to DF system 102 in near-real or real-time, periodically, based on an occurrence of predefined events (e.g., predefined time(s), predefined date(s), etc.), based on changes in data, based on an existence of new data, etc.

In some examples, DF system 102 may be configured to pull data (e.g., via a client pull type of network communication) from among one or more among data source(s) 104 by transmitting one or more data requests and/or interrogating the one or more data source(s) 104. For example, data source 104-1 may be configured to send data to DF system 102 in response to a data request from DF system 102.

In some examples, a data feed may be configured to deliver at least one data stream from among one or more of data source(s) 104 to DF system 102. The data stream(s) may be delivered, for example, automatically or on demand. In general, data feeds may be configured in one or more formats including, without being limited to, RSS (e.g., RDF Site Summary, Rich Site Summary, Really Simple Syndication), Atom, Resource Description Framework (RDF), comma-separated values (CSV), JavaScript Object Notation (JSON) and Extensible Markup Language (XML).

In some examples, DF system 102 may obtain data from among one or more of data source(s) 104 via at least one data file transfer according to a suitable file transfer protocol. To illustrate, one or more computer files may be transmitted through an electronic communication channel established between a data source (e.g., data source 104-1) and DF system 102, mediated via a suitable communications protocol. In general, the communication protocol represents a system of rules, syntax, semantics, synchronization of communication and/or error recovery methods that allow two or more computer systems to exchange information. In general, the file transfer protocol implements rules to transfer files between two computing endpoints. The file transfer protocol may include an unsecured file transfer protocol, a secure file transfer (SFT) protocol, a multicast routing protocol and/or a managed file transfer (MFT) protocol. Non-limiting examples of file transfer protocols include File Transfer Protocol (FTP), Secure Shell (SSH) file transfer protocol (SFTP), Hypertext Transfer Protocol (HTTP), HTTP Secure (HTTPS) and EForward. The communications protocol and the file transfer protocol may be implemented by hardware, software or a combination thereof.

DF system 102 may include one or more data source interfaces 120, data verifier 122, data metric/trend model 124 having at least one data trend projection (DTP) algorithm 126, data distributer 128, data dissemination interface 130, controller 132 and one or more reference databases 134. In some examples, data dissemination interface 130 may include website portal 136 (described further below). In some examples, data dissemination interface 130 may disseminate data through, without being limited to, email, file transfer (e.g., secure and/or unsecure) a communications channel, a data feed, etc. In some examples, components 120-136 may communicate with each other via a data and control bus (not shown).

Data source interface(s) 120 may represent, for example, an electronic device including hardware circuitry and/or an application on an electronic device for communication with data source(s) 104. In some examples, data source interface(s) 120 may include more than one interface, with different interfaces dedicated to different data source(s) 104 depending upon the communication and/or data transfer capabilities of particular ones of data source(s) 104.

Data dissemination interface 130 may represent, for example, an electronic device including hardware circuitry and/or an application on an electronic device for communication with dissemination entity(s) 106. Although one dissemination interface 130 is shown in FIG. 1, it is understood that dissemination interface 130 may include one or more interfaces. For example, dissemination interface 130 may include more than one interface, with different interfaces dedicated to different dissemination entity(s) 106 depending upon the communication and/or data transfer capabilities of particular ones of dissemination entity(s) 106.

Controller 132 may be configured to oversee the entire technique including the creation of projected data trend(s) (e.g., forecasted data) from the verified data and dissemination of the projected data trend(s). In some examples, controller 132 may also oversee the market surveillance of data source(s) 104, inputs to DF system 102 and scrutiny of the methodology (e.g., provided by DTP algorithm 126). Controller 132 may include, for example, a processor, a microcontroller, a circuit, software and/or other hardware component(s) specially configured to control operation of data source interface(s) 120, data verifier 122, data metric/trend model 124, DTP algorithm 126, data distributer 128, data dissemination interface 130, reference database(s) 134 and website portal 136. In some examples, the market surveillance of data source(s) 104 may be conducted by data verifier 122 (described further below with respect to FIG. 2) on data inputs post publication and may be used by DF system 102 prior the creation of term risk free rates (RFRs) (described further below).

Figure 2:
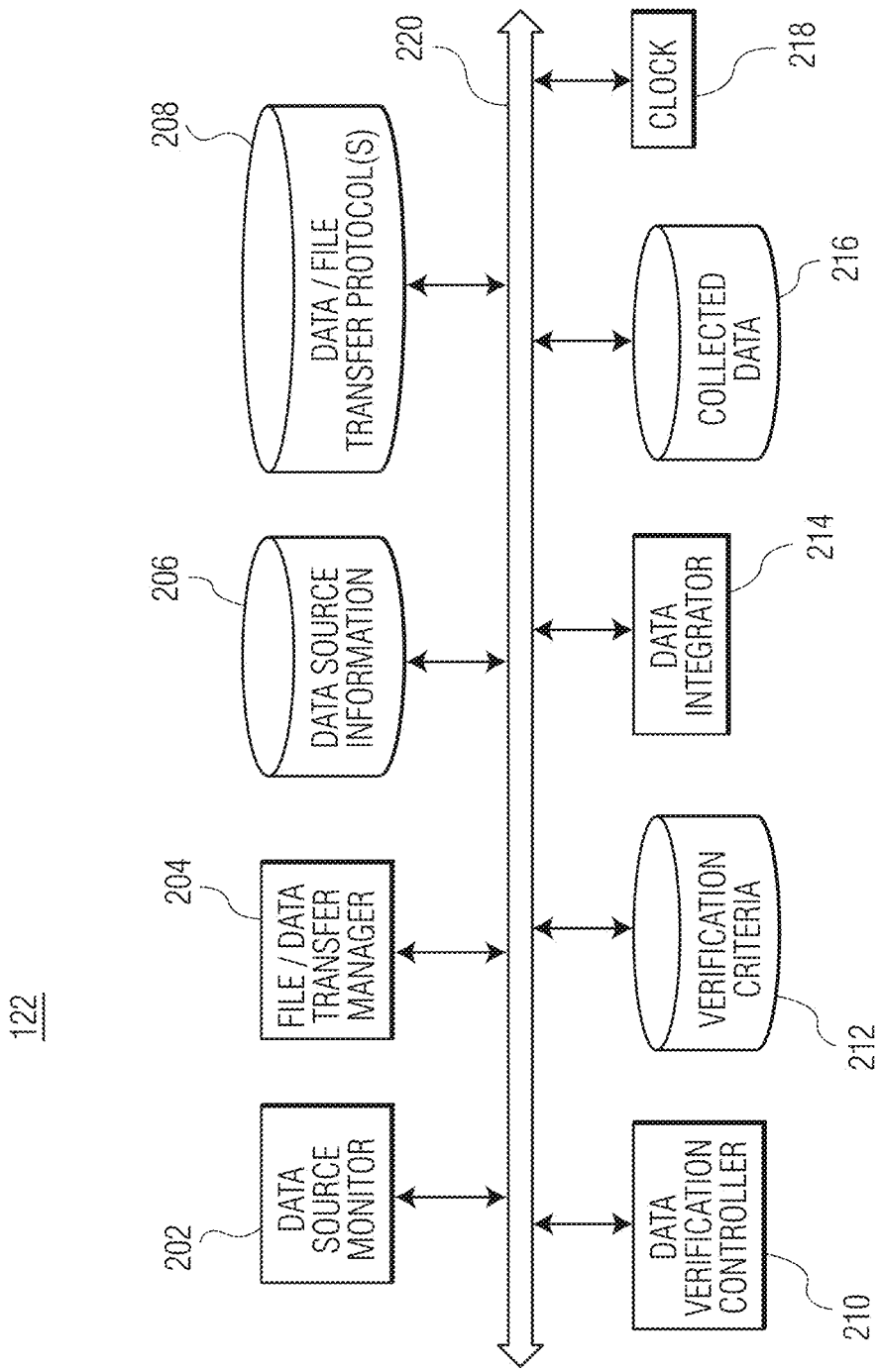
FIG. 2 is a functional block diagram of an example data verifier associated with the environment shown in FIG. 1, according to an aspect of the present disclosure.

Referring next to FIG. 2, a functional block diagram of example data verifier 122 of DF system 102 is shown. Data verifier 122 may include data source monitor 202, file/data transfer manager 204, database 206 storing data source information, database 208 storing one or more data and/or file transfer protocols, data verification controller 210, database 212 storing one or more verification criteria, data integrator 214, at least one database 216 storing collected data and clock 218. Components 202-218 may communicate with each other via data and control bus 220.

Although FIG. 2 illustrates separate databases 206, 208, 212 and 216, it is understood that data verifier 122 may also be configured with more or fewer databases, including one database. In general, databases 206, 208, 212 and 216 are each configured to electronically store one or more data records and/or data files in electronic storage. Each of databases 206, 208, 212 and 216 may be configured according to a suitable architecture, including, without being limited to, a relational database, a non-relational database, a document database, a graph database, an XML database, an object-oriented database, etc.

Data source monitor 202 may be configured to communicate with one or more of data source(s) 104 to identify new and eligible data for verification and use by data metric/trend model 124. For example, data source monitor 202 may parse and/or analyze data among data source(s) 104 and compare the analyzed data against one or more predetermined criteria. If the analyzed data meets the predetermined criteria, data source monitor 202 may cause data verifier 122 to obtain the analyzed data from the respective data source 104. For example, data source monitor 202 may cause file/data manager 204 to obtain the analyzed data, such as via a client pull, from a data feed, from a server push, via a file transfer protocol, etc.

In some examples, data verifier 122 may obtain the data (e.g., via push and/or pull techniques) prior to any comparison against the predetermined criteria, and then data verifier 122 may either accept the obtained data or reject the obtained data. In some examples, the predetermined criteria may include criteria for determining whether to actually obtain the data from among data source(s) 104 (e.g., so that only data satisfying the predetermined criteria is obtained by data verifier 122). In such examples, the obtained data may also be subject to further analysis/verification (e.g., via one or more verification criteria) before the obtained data is accepted or rejected. Accordingly, in examples where data is first obtained and then subject to criteria for acceptance or rejection, the predetermined criteria may include one or more verification criteria (as discussed further below).

In some examples, data source monitor 202 may monitor one or more data feeds among data source(s) 104. In some examples, data source monitor 202 may monitor data pushed to data verifier 122. In some examples, data source monitor 202 may monitor any data file(s) transferred to data verifier 122. In some examples, data source monitor 202 may cause file/data transfer manager 204 to pull data (e.g., via a client pull) according to one or more predetermined times and/or conditions. In some examples, data source monitor 202 may establish a dedicated communication channel with one or more of data source(s) 104 that may be different from a data feed. For example, the dedicated communication channel may be specific to data verifier 122 and may be associated with a particular portion of data of interest to data verifier 122. In some examples, the dedicated communication channel may be a secure communication channel.

Data source monitor 202 may monitor data of data source(s) 104 at one or more particular times (e.g., periodically), under one or more particular conditions, in near-real time, in real-time (e.g., continuously), etc. The frequency of monitoring performed by data source monitor 202 may depend upon a particular data source 104. For example, data source 104-1 may only update its data once a day, whereas data source 104-2 may receive rapidly changing updates over a predetermined time period (e.g., eight hours). Data source monitor 202 may, for example, use data source information stored in database 206 in order to determine the frequency of data source monitoring as well to determine the type(s) of communication to use (e.g., a data feed, a server push, etc.) or pro-actively detect (e.g., via a dedicated communication channel, a client pull, etc.).

Data source monitor 202 may use any suitable predetermined criteria for identifying new/eligible data for verification. Non-limiting examples of the predetermined criteria may include a predetermined change in a data value, a predetermined time, a new data point (e.g., not associated with any previously monitored data), metadata information associated with particular data, etc. In this manner, data source monitor 202 may be configured to obtain the most relevant, most up-to-date and newly eligible data from among data source(s) 202 without solely relying on data source(s) 104 to push data to DF system 102 (e.g., data that may be stale and/or not relevant).

File/data manager 204 may be configured to manage the handling of data into data verifier 122 in accordance with data source monitor 202. File/data manager 204 may obtain data from among data source(s) 104 in accordance with various data and/or file transfer protocols (e.g., stored in database 208). Database 208 may also store various communication protocols. As discussed above, data source(s) 104 may be configured to communicate with DF system 102 via one or more data transfer protocols (e.g., a server push, a client pull, a data feed, over a dedicated communication channel) and/or file transfer protocols. File/data manager 204 may use data source information (e.g., stored in database 206) to determine an appropriate data transfer, file transfer and/or communication protocol to use in order to obtain data and/or data file(s) from a particular data source (e.g., data source 104-1). File/data manager 204 may also be configured to transfer the obtained data to data verification controller 210. In some examples, file/data manager 204 may transfer the obtained data to database 216, for example, for temporary storage. In some examples, the obtained but not verified data may be stored in database 216 together with an indicator tagging the data as still-to be verified (or any other suitable indication).

Database 206 may be configured to store any suitable information associated with data source(s) 104 that may be useful for data source monitor 202, file/data transfer manager 204, data verification controller 210 and/or data integrator 214 for obtaining, analyzing and processing of data from among data source(s) 104. Non-limiting data source information that may be stored in database 206, for each particular data source 104 may include data transfer format(s) supported, file transfer format(s) supported, encryption/decryption information, communication channel information, metadata information associated with the data, data format(s) associated with the data, any data normalization information associated with the data (e.g., if the particular data source has unique, non-standard values and/or formats), data monitoring characteristics for the particular data source (e.g., a frequency for monitoring, predetermined criteria for identifying data), etc.

Database 208 may be configured to store one or more communication protocols, one or more data transfer protocols and one or more file transfer protocols (as discussed in the examples above) for communicating with data source(s) 104 and for transferring data and/or files from among data source(s) 104.

Data verification controller 210 may be configured to verify the obtained (e.g., incoming) data from file/data transfer manager 204 and/or from temporary storage in database 216. Data verification controller 210 may compare the incoming data to one or more verification criteria (e.g., stored in database 212). In some examples, the verification criteria may depend upon the particular data source (e.g., data source 104-1). In some examples, the verification criteria may be independent of a particular data source.

The verification criteria may include criteria related to data source verification, data format verification, file format verification, and/or data content verification. Non-limiting examples of data verification criteria may include criteria related to data type, data range, one or more allowed characters, identification of any missing records, cardinality, one or more constraints, cross-system consistency, consistency (e.g., that the data is logical, for example, a delivery date is not before an order date), file existence, data format, one or more logic checks (e.g., an input does not yield a logical error such as being 0 if is to divide with another number), validation of the presence of required data, etc. In some examples, for data trends/metrics relating to forward-looking term interest rates, the verification criteria may include corroborative data source checks, product checks, date checks, holiday calendar checks, maturity checks and/or rate/price error checks. In some examples, clock 218 (e.g., for time and/or data information) may be used along with the verification criteria to verify the incoming data.

In some examples, one or more of the verification criteria may represent a security protocol, to verify that the incoming data/files are from an appropriate data source. For example, the verification criteria may include a comparison of one or more unique identifiers associated with the received electronic data/files (e.g., a unique data file identifier and/or a unique data source identifier). Such a verification may be advantageous in preventing denial of service attacks and other malicious actions which are intended to harm DF system 102 or dissemination entity(s) 106 (e.g., by way of DF system 102).

Data verification controller 210 may be configured to verify the incoming data when the incoming data meets the verification criteria. When the incoming data does not meet the verification criteria (e.g., "disqualified data"), data verification controller 210 may discard the obtained data from data source(s) 104. For example, data verification controller 210 may discard the disqualified data from database 216 (or may update the indicator to tag the data as disqualified, for purging of database 216 at a later time). Data verification controller 210 may include, for example, a processor, a microcontroller, a circuit, software and/or other hardware component(s) specially configured to verify the incoming data.

In some examples, when data verification controller 210 verifies the incoming data, data verification controller 210 may store the verified data in database 216 and may update the indicator to tag the data as verified. In some examples, data verification controller 210 may transfer the verified data to data integrator 214. In some examples, data verification controller 210 may directly transfer the verified data to data metric/trend model 124 and/or to reference database(s) 134.

Data integrator 214 may be configured to convert the verified data to integrated data suitable for analysis by data metric/trend model 124 and dissemination via dissemination interface 130. Data integrator 214 may be configured to at least one of reformat, aggregate, decompress and/or unpack the data in order to generate integrated data.

For example, as discussed above, the electronic data/files received by data verifier 122 from among data source(s) 104 may be in a variety of formats (which formats may be known from the associated data source information stored in database 206). Additionally, the data/file formats may have different data transfer parameters, compression schemes, etc. Furthermore, in some examples, data content may correspond to different forms of data, such as different currencies, date formats, time periods, etc. In one example, data verifier 122 may receive separate electronic data/file for each request for information. In another example, data verifier 122 may receive a single data file, corresponding to one or more requests for information, from each of data source(s) 104 which it monitors.

Data integrator 214 may reformat the verified data having plural data formats by parsing/analyzing the received data to identify its data type, and then converting the received data into data having a predefined data format or type. For example, reformatting may involve converting data having different formats CSV, XML, text into data having a single format (e.g., CSV, a proprietary format, etc.).

Data integrator 214 may aggregate the verified data by combining data and/or a plurality of electronic data files from one or more of data sources 104 into a single compilation of electronic data (e.g., one electronic data file) based on certain parameters and/or criteria. For example, data may relate to a particular product or instrument, and recent observations including information regarding risk free interest rate data, futures price data, futures trading data, overnight index swap data and/or other suitable data may be combined or aggregated for each particular product or instrument.

Data integrator 214 may decompress validated data from a compressed format (where the data has been encoded using fewer bits than were used in its original representation), by returning the data to its original representation for use within DF system 102. For example, "zipped" data files (which refer to data files that have been compressed) may be "unzipped" (or decompressed) by integrator 214 into electronic data files having the same bit encoding as they did prior to their being "zipped" (or compressed).

Data integrator 214 may unpack one or more validated data files, by opening the data file(s), extracting data from the data file(s), and assembling the extracted data in a form and/or format that is suitable for further processing. The sequences for opening and/or assembling the data may be predefined (for example, data may be opened/assembled in a sequence corresponding to timestamps associated with the data).

In some examples, when data integrator 214 integrates the verified data, data integrator 214 may store the integrated data in database 216 and update the indicator to tag the data as integrated. In some examples, data integrator 214 may directly transfer the integrated data to data metric/trend model 124 and/or to reference database(s) 134.

Although the example above describes data integrator 214 converting the verified data to integrated data, in some examples, data integrator 214 may perform at least some data integration functions on the incoming data (e.g., reformatting, decompressing, etc.) prior to verification of the incoming data by data verification controller 210.

Database 216 may be configured to temporarily store incoming data, verified data and/or integrated data (e.g., from data integrator 214). In some examples, controller 132 may be configured to monitor database 216 to monitor a progress of data processing by various components of data verifier 122, based on the status of the indicator associated with the stored data in database 216 (e.g., to-be-verified, verified, integrated, discarded). Controller 132 may thus identify newly integrated data, and may transfer the integrated data to reference database(s) 134 for processing by data metric/trend model 124. In some examples, controller 132 may transfer the data upon identifying its status as integrated. In some examples, controller 132 may transfer the data at one or more times (e.g., periodically, under particular conditions, etc.).

In operation, data verifier 122 may be configured to monitor data source(s) 104 for new and eligible data (e.g., via data source monitor 202) and to verify incoming data from among data source(s) 104 (e.g., via data verification controller 210). In some examples, the verification may include comparing the incoming data to one or more verification criteria (e.g., stored in database 212). In some examples, the verification criteria may include corroborative data source checks, product checks, date checks, holiday calendar checks, maturity checks and/or rate/price error checks. In some examples, data verifier 122 may proactively pull data from among data source(s) 104 (e.g., via file/data transfer manager 204). In some examples, data from among data source(s) 104 may be pushed to DF system 102 at one or more times (e.g., periodically, under particular conditions, etc.).

In this manner, DF system 102 (via data verifier 122) may dictate receiving only the type and volume of data and information that is pertinent to supplementing and/or generating data forecasts related to one or more electronic data classes for which directly-related or historical information is sparse or unavailable. In this manner, the processing and memory requirements of DF system 102 are maximized (i.e., by avoiding receiving irrelevant or voluminous data beyond what is needed or desired), particularly in embodiments where it is envisioned that millions of data requests and/or data files are received per day.

One or more or more of the functions discussed above with respect to FIG. 2 (including, for example, monitoring data, obtaining data, verifying the data and integrating the data) as being carried out by data verifier 122 may be performed in a suitable order or sequence. Further, one or more of these functions may be performed in parallel, on all or on portions of the received data. Still further, one or more of these functions may be performed multiple times. Collectively, one or more of these functions may be performed by data verifier 122 to ultimately generate the integrated data (e.g., data having similar data characteristics (e.g., format, compression, alignment, currency, etc.)). Data verifier 122 may also perform additional and/or alternative functions to form the verified and integrated data.

Referring back to FIG. 1, it may be appreciated that, because data verifier 122 generates integrated data, data that is disseminated by data dissemination interface 130 provides electronic data to dissemination entity(s) 106 from multiple data sources 104 in an integrated form, without dissemination entity(s) 106 having to perform such integration functions. Additionally, data source(s) 104 may not have to reformat the data it generates prior to transmitting the data to DF system 102, as data verifier 122 is able to receive and process data having any of a plurality of data formats. This, in turn, preserves the system resources and improves efficiencies of the data source(s) 104.

Data metric/trend model 124 may be configured, in one exemplary embodiment, to process verified data input (e.g., from among the risk free interest rate data, futures price data, futures trading data, overnight index swap price data, overnight index swap trading data and/or any other suitable data input from among data source(s) 104) using various filtration processes and mathematical operations implemented by DTP algorithm 126, to create data metrics and/or project data trends. Data metric/trend model 124 may provide the data metrics/trends to data distributer 128 for dissemination. In some examples, the data metrics/trends may be stored in reference database(s) 134.

In one non-limiting example, the data metrics and projected data trends may include deriving implied rates and rate change dates and compounding the implied rates over one or more relevant periods. The compounded rates may then be used to determine one or more forward-looking term interest rates. Data metric/trend model 124 may also use other inputs from among data source(s) 104, such as a relevant business day calendar and a calendar, for example, of scheduled central bank meeting dates for one or more relevant currency areas. In some examples, data metric/trend model 214 may include one or more financial models. In some examples, DTP algorithm 126 of data metric/trend model 124 may include a customized variation of a step function methodology, for deriving term settings from futures and risk free rate data. In some examples, the risk free rate data may include at least one currency-specific overnight (ON) rate (e.g., for UK pound sterling, US dollar, Japanese yen, Swiss franc, European Union euro, etc.), and the currency-specific ON rate(s) together with particular futures prices (in some examples, futures settlement prices) may be used to derive forward-looking term interest rate(s). In general, the currency-specific ON rate may include any suitable existing or not yet existing currency-specific ON rate. In some examples the risk free rate data may include spot/next and/or tomorrow/next rates. In general, the risk free rate data may include any suitable risk free rate data which may be useful for deriving forward-looking term rate information.

In some examples, the data metrics and projected data trends may include combining snapshots of trading data into synthetic order books, which may be filtered and averaged to determine input values with which to derive a forward-looking term rate. In some examples, DTP algorithm 126 of data metric/trend model 124 may include a customized variation of a synthetic order book construction methodology, for deriving term settings from futures and/or overnight index swap data.

In general, DTP algorithm 126 may be configured to create an enhanced data set (e.g., forecasted data including forward-looking term interest rate(s)) from monitored, filtered, processed and verified data from among one or more data source(s) 104. DTP algorithm 126 may also be configured to push to, store in and retrieve from reference database 134 certain data inputs. An example embodiment of DTP algorithm 126 is described further below.

Data distributer 128 may be configured to identify any newly determined data metrics/data trends (e.g., via data metric/trend model 124 and/or based on data stored in reference database(s) 134). In some examples, data distributer 128 may perform one or more quality control checks and/or verification operations on the data metrics/data trends prior to dissemination via data dissemination interface 130, to confirm that the information is consistent with one or more predetermined criteria for dissemination. Data distributer 128 may also be configured to submit the data metrics/data trends (upon determining that the data meets the predetermined criteria) to data dissemination interface 130. In some examples, data distributer 128 may perform additional formatting and/or portioning of the metrics/data trends in a manner suitable for dissemination to various dissemination entity(s) 106 and/or website portal 136. For example, dissemination entity 106-1 may be configured to receive a first portion of the data to be disseminated, whereas dissemination entity 106-2 may be configured to receive a second, different portion of the data. As another example, dissemination entity 106-1 may be configured to receive data in one data format whereas dissemination entity 106-2 may be configured to receive data in a different data format.

Data dissemination interface 130 may be configured to disseminate forecasted data (e.g., data metrics/projected data trends), such as one or more forward-looking term interest rates. In some examples, data dissemination interface 130 may be communicatively coupled to one or more websites (an example of dissemination entity(s) 106), such that interface 130 may be configured to publish the disseminated data (e.g., forward-looking term interest rate(s)) through the website(s) and/or secure file transfer.

In some examples, data dissemination interface 130 may be further or alternatively be communicatively coupled to one or more redistributors (an example of dissemination entity(s) 106, for example, Bloomberg, Refinitiv, etc.). In some examples, the forward-looking term interest rate(s) may be included and published as part of one or more redistributed risk free rates (e.g., for sterling, US dollar, euro, Swiss franc, Japanese yen currency areas), one or more forward-looking term interest rate settings for these risk free rates, and/or one or more backward-looking realized (simple or compounded) average risk free rate settings for these risk free rates that are included in website portal 136 (e.g., published risk-free rate (RFR) data portal such as shown in FIGS. 9A and 9B) or released together, combining all the relevant information. Additional further risk free rate information and data may be added to the publication.

In some examples, data dissemination interface 130 may include dedicated website portal 136. Input data from any number of external data sources (e.g., including among data source(s) 104) together with data determined by DF system 102 may be transmitted directly into dedicated website portal 136 over a wired/wireless network, and periodically updated with new information and/or data as it becomes available, including in real-time. In this manner, dedicated website portal 136 may provide a "one-stop-shop" for accessing data (including, in some examples, various risk free rate data), thereby eliminating the need of having to connect to and/or access different data sources, different websites, etc. (and in some examples, conduct separate calculations). Thus, dedicated website portal 136 may interconnect users to various data sources, pipelines and/or data feeds, and provide access to all such sources, together in one location (e.g., dedicated website portal 136), thereby improving accessibility of data to users and permitting access to all relevant data in one location (from dedicated website portal 136). Since such access is provided in a single location, users may avoid having to depart dedicated website portal 136 to access the multiple data source locations (e.g., portals, websites, data source feeds, etc.) from which the data/information originates (and in some examples, perform their own calculations, etc.).

In some examples, components 120-136 of DF system 102 may be embodied on a single computing device. In other examples, components 120-136 of DF system 102 may be embodied on two or more computing devices distributed over several physical locations, connected by one or more wired and/or wireless links. It should be understood that DF system 102 refers to a computing system having sufficient processing and memory capabilities to perform the specialized functions described herein.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network. For example, a system according to the present disclosure includes an ordered combination of specialized computer components (e.g., data verifier, data metric/trend model, data dissemination interface include a dedicated website portal, etc.) for monitoring multiple data sources, receiving large volumes of data having varying data formats and originating from the various data sources, verifying the data from the various data sources, converting the data to have an integrated format, generating data forecasts and then disseminating the forecasts to dissemination entities. As a result, the data forecasting system detects the most up-to-date information, only processes the volume of information that is accurate (e.g., verified) and also the type of data that may be useful for projecting data trends and generating data metrics, thereby improving the overall accuracy of the data forecasts and the speed of the system to determine and disseminate data forecasts (e.g., when data from data sources rapidly changes).

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 3:
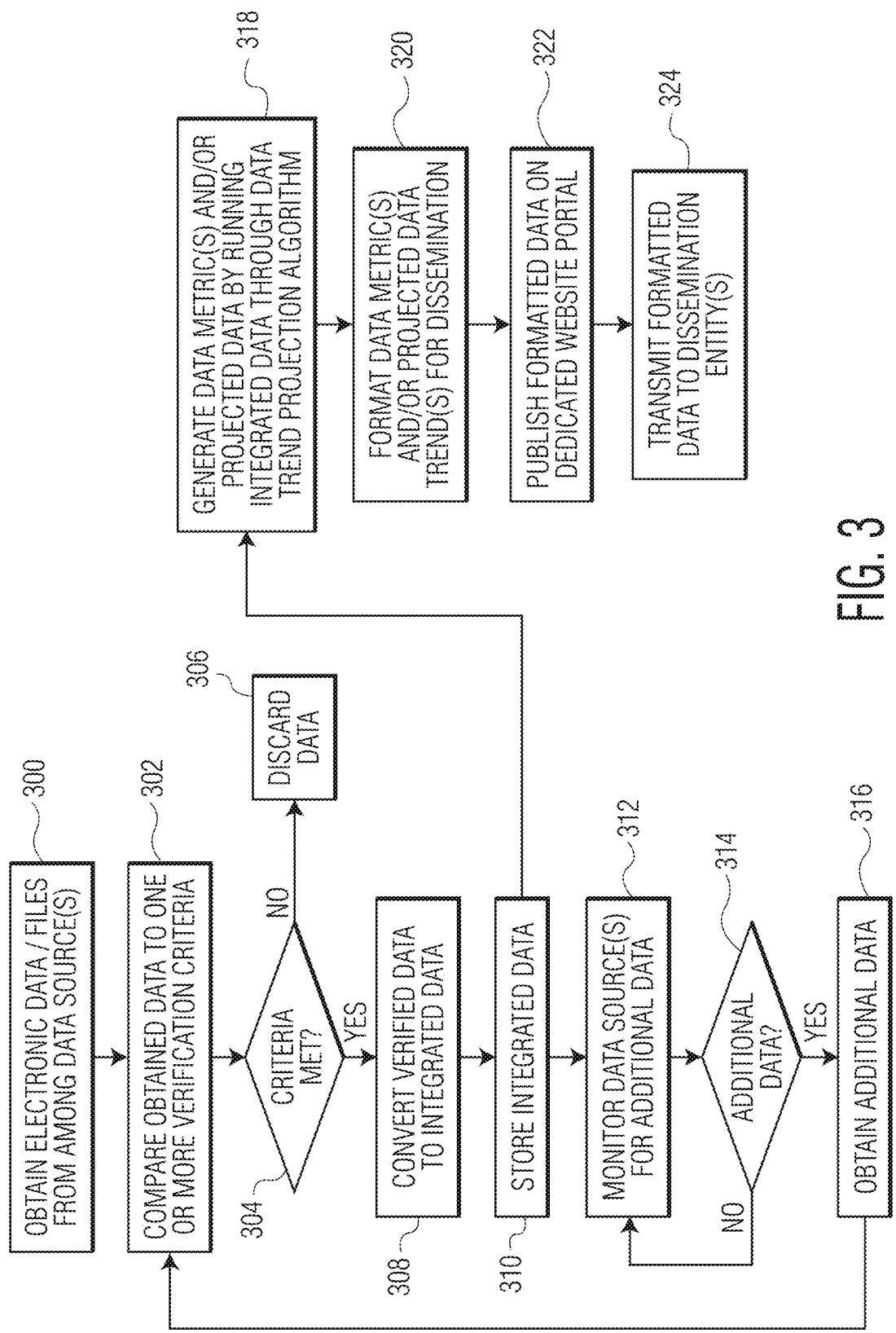
FIG. 3 is a flow chart diagram illustrating an example method for projecting one more trends in electronic data and generating enhanced data, according to an aspect of the present disclosure.
Figure 4:
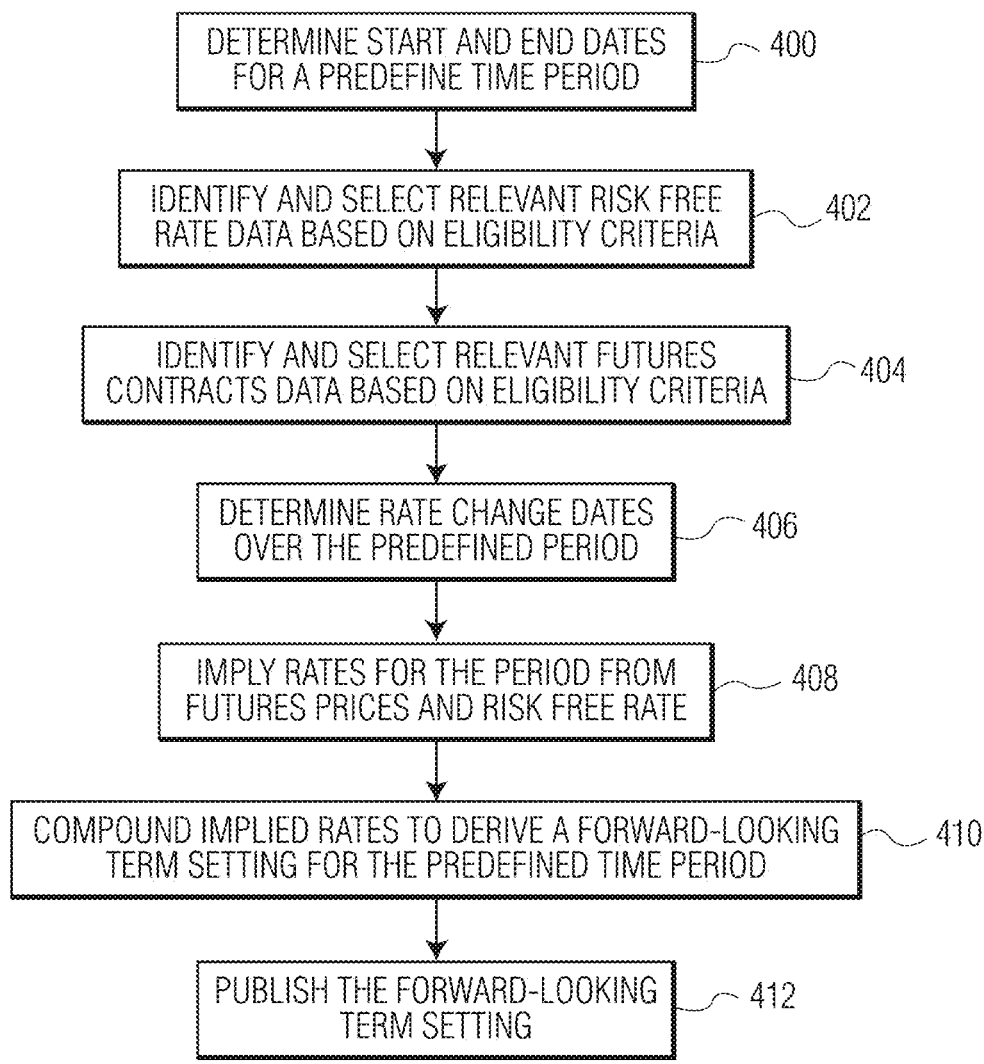
FIG. 4 is a flow chart diagram illustrating an example method for projecting data trends including forward-looking term interest rate(s), according to another aspect of the present disclosure.

DF system 102 may be configured with more or less modules to conduct the methods described herein with reference to FIGS. 3 and 4. In particular, FIG. 3 is a flow chart diagram illustrating an example method for projecting one more trends in electronic data and generating enhanced data, according to an aspect of the present disclosure; and FIG. 4 is a flow chart diagram illustrating an example method for projecting data trends including forward-looking term interest rate(s), according to another aspect of the present disclosure. As illustrated in FIGS. 3 and 4, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 3 and 4 may be performed by one or more specialized processing components associated with components 120-136 of data structure management environment 100 of FIG. 1.

Referring next to FIG. 3, an example method for projecting data trend(s) in electronic data and generating enhanced data is shown. At step 300, electronic data and/or electronic data files may be obtained by DF system 102 from among data source(s) 104. For example, data source monitor 202 may cause file/data transfer manager 204 to obtain data/file(s) from among data source(s) 104 via data source interface(s) 120. The data may be obtained (according to any suitable communication protocol and data/file transfer protocol), for example, responsive to a server push, a client pull, data in a data feed, data from a separate dedicated communication channel, a file transfer and/or any other suitable technique. In some examples, the obtained data may be temporarily stored, such as in database 216 (e.g., with an indicator tagging the data as being to-be-verified). In some examples, data integrator 214 may perform some preliminary integration operation on the obtained data.

At step 302, data verification controller 210 may compare the obtained data to one or more verification criteria (e.g., stored in database 212). This compare function may be used to verify that only data satisfying the certain of the verification criteria is obtained, and/or verify that the obtained data is filtered by reference to the verification criteria and then either kept, discarded, or a combination thereof. At step 304, data verification controller 210 may determine whether the predetermined criteria (e.g., criteria related to data source verification, data format verification, file format verification, and/or data content verification) is met.

When, at step 304, it is determined that the obtained data fails to meet one or more of the verification criteria, step 304 proceeds to step 306 and data verification controller 210 may discard the data. In some examples, any temporarily stored data in database 216 that is determined to be un-verified may be removed. In some examples, an indicator of any temporarily stored data in database 216 that is determined to be un-verified may be updated to an un-verified status and the associated data may be removed from database 216 at a later time.

When, at step 304, it is determined that the obtained data meets the verification criteria, step 304 proceeds to step 308 and data integrator 216 may convert the verified data to integrated data. In some examples, the verified data may be stored in database 216 (e.g., with the indicator updated to tag the data as verified), after the data is verified and prior to being converted to integrated data. As discussed above, data integrator 214 may be configured to at least one of reformat, aggregate, decompress and/or unpack the data in order to generate integrated data.

At step 310, the integrated data may be stored (e.g., in database 216 and/or in reference database(s) 134). For example, an indicator of the integrated data may be updated to an integrated status and stored in database 214.

At step 312, data source monitor 202 may monitor data source(s) 104 to identify additional data that may be useful (e.g., suitable) for generating data metrics and/or data trends (by data metric/trend model 124). For example, data source monitor 202 may monitor one or more predetermined characteristics from data in a data feed, from directly monitoring data source(s) 104 (e.g., via a dedicated communication channel), from data pushed to DF system 102, etc.

At step 314, data source monitor 202 may determine whether additional data may be present (e.g., based on the predetermined characteristic(s)). When, at step 314, it is determined that no additional data is present, step 314 proceeds to step 312 and data source monitor 202 may continue to monitor data source(s) 104 for additional data.

When, at step 314, it is determined that additional data is present, step 314 proceeds to step 316, and data source monitor 202 may cause file/data transfer manager 204 to obtain the additional data. Step 316 proceeds to step 302. In this manner, data verifier 122 may continue to monitor and obtain additional data without waiting for data source(s) 104 to push data (which pushed data in and of itself may or may not be relevant to DF system 102).

At step 318, data metric/trend model 124 may generate one or more data metrics and/or projected data trends (forecasted data) by running the integrated data (from step 310) through DTP algorithm 126. A non-limiting example of DTP algorithm 126 is described below with respect to FIG. 4.

At step 320, data distributer 128 may format the forecasted data (data metric(s) and/or projected data trend(s) determined at step 318) for distribution, for example to dissemination entity(s) 106 and/or website portal 136. In some examples, data distributer 128 may perform quality control check(s) and/or verification of the data metric(s)/projected data trend(s) (e.g., as part of market surveillance operations which may be performed by DF system 102).

At step 322, data distributer 128 may cause the formatted (forecasted) data to be published on dedicated website portal 136 of data dissemination interface 130. At step 324, the formatted (forecasted) data may be transmitted to one or more among dissemination entity(s) 106 via data dissemination interface 130. In some examples, step 324 may be optional. For example, dissemination entity(s) 106 may be able to access the forecasted data directly from website portal 136.

One example of a sparse electronic data set includes electronic transactional data associated with term interest rates including term risk free rates. Participants in such an industry (including borrowers, retail entities, portfolio managers, analysts, regulatory compliance teams, electronic financial planning and operating systems, etc.) may seek information on term interest rates, for example, for budgeting, cash flow and/or risk management purposes.

The introduction of alternative risk free rates (RFRs) is important to electronic financial markets. For purposes of this disclosure, these alternative interest rates represent rates that offer significant promise as benchmarks, as they provide a robust indication of short-term borrowing costs in some of the largest economic zones across the globe.

In general, alternative risk free rates may measure overnight borrowing costs in either unsecured or secured electronic financial markets. In this regard, they are different from term benchmark interest rates (e.g., LIBOR, EURIBOR, TIBOR, etc., generally referred to as the IBORs), typically the most actively used interest rate benchmarks in financial contracts today. This is because the term benchmark interest rates (generally also overnight or spot-next rates) are typically published for multiple forward-looking tenors (or terms) which seek to measure expected wholesale, unsecured bank borrowing costs over specified periods (e.g., one, three, six and twelve months). The use of alternative risk free rates with respect to certain types of complex (e.g., non-derivative or "cash") products presents technological challenges that existing systems in this art are incapable of handling.

In some instances, market participants may value having forward-looking term rates in their financial contracts for budgeting, cash flow and risk management purposes. Large and small businesses may generally value certainty in calculating their interest expense and other contractual payments. This, and the ability to know forward-looking interest rates in advance for one, three, six and twelve month time periods, have made term benchmark interest rates attractive in certain areas. Retail borrowers may also value knowing what their obligations will cost in advance, particularly those with mortgages or long-dated student loans. In addition, many electronic financial planning and operating systems are specifically configured for contracts that reference forward-looking term rates and may not be equipped to process compound interest accruals on a daily basis. Redesigning these systems (i.e., technologically re-configuring, re-programming, modifying hardware, modifying software, etc.) could prove to be an expensive and time-consuming procedure for many businesses.

Given the benefits associated with forward-looking term rates, many market participants and working groups have expressed significant interest in the development of term structures for alternative risk free rates in certain use cases.

Actively used regional interest rate benchmarks include the IBORs, such as LIBOR, EURIBOR and TIBOR. These term benchmarks may be published for multiple forward-looking tenors (or terms). Having a forward-looking term structure means the term benchmarks may provide a measure of the expected average rate over a specified period (a "term rate"). The forward-looking term rates can be used to calculate upcoming contractual payments (such as interest due) at the beginning of an accrual period based on a forward-looking rate set in advance, as opposed to having to wait until the end of the accrual period to calculate a payment based on overnight rates.

For example, a retailer that needs to borrow money in late September to fund increased inventory prior to the holiday season can determine its floating rate cost of debt through to year-end in advance by using a three month term interest rate benchmark rather than having to calculate this cost at the end of the period based on historical overnight rates. This feature has made the term benchmarks such as IBORs attractive to borrowers (and other financial markets participants using floating interest rates) that value a forward-looking rate, certainty and advance knowledge in respect of their contractual payments for budgeting, risk management or operational purposes.

In contrast to term benchmarks (such as the IBORs), RFRs (risk free rates) may be considered "overnight rates". This means that they provide a measure of interest rates paid overnight in circumstances where other risk factors are negligible. Thus, the IBORs have an overnight rate. A difference, however, is that the IBORs also have term rates whereas RFRs only have an overnight rate. Various (overnight rate-based) RFRs may relate to different currencies (e.g., Great Britain pound sterling (e.g., SONIA), United States dollar (e.g., SOFR), Japanese yen (e.g., TONA), Swiss franc (e.g., SARON), and European Union euro (e.g., €STR)). Conventional overnight rates, however, do not replicate the forward-looking term structures of term benchmarks. It is desirable to develop forward-looking term rates for RFRs ("term RFRs") in particular markets (e.g., for non-derivative or "cash" products, such as loans and notes) where forward-looking rates may be useful (e.g., for providing additional certainty and/or advance knowledge). In order to accomplish this, a new system and method for determining/forecasting sparse data is needed.

According to some aspects of the present disclosure, DF system 102 (FIG. 1) may derive one or more forward-looking term rates for one or more term RFRs. A term RFR may indicate a market's expectation of the average overnight rate over a specified period (e.g., one, three or six months). The term RFR may then be used to satisfy financial and operational requirements to calculate upcoming contractual payments at the beginning of an accrual period using forward-looking rates. Thus, a term RFR with forward-looking rate(s) would give end user entities (e.g., corporations, small business, retail borrowers, etc.) greater certainty and would support liquidity management and cash flow planning.

The forward-looking term rates may be derived using the system of the present disclosure from market data points that offer an indication of the market's expectation of future RFR settings. In some non-limiting examples, deep sources of data (e.g., data sources with suitable and/or large amounts of information) from which to derive expected RFR settings include forward-looking derivative contracts such as futures contracts and interest rate swaps that reference RFRs. Non-limiting examples of electronic derivatives markets that may be appropriate for deriving term RFRs may include (without limit) the overnight index swaps (OIS) market and the futures market.

Figure 5A:
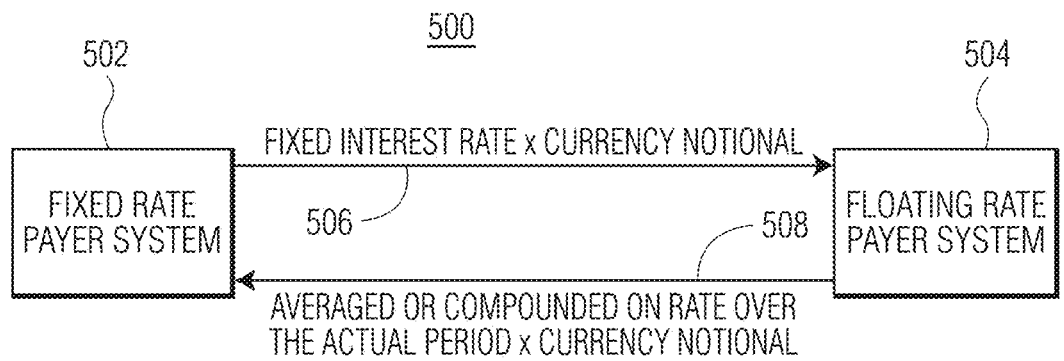
FIG. 5A is s a functional block diagram of an example overnight index swap transaction system, according to an aspect of the present disclosure.

Referring to FIG. 5A, a functional block diagram of example OIS transaction system 500 is shown. OIS transaction system 500 may include fixed rate payer system 502 and floating rate payer system 504 between which one or more OIS may be performed. In general, OIS may refer to interest rate swap contracts under which periodic payments 506 (calculated by applying a fixed interest rate to a given notional amount for a specified period) are swapped against payments 508 (calculated by applying an overnight floating rate). The overnight floating rate may include, for example, a RFR averaged or compounded over that specified period, to that same notional amount.

For example, a typical OIS contract in the Sterling markets would reference a set notional amount (e.g., £100 m). One party may receive a fixed rate multiplied by the set notional amount for a predetermined time period (e.g., one month) while paying the other party the compounded ON rate over the same period multiplied by the same set notional amount.

In some examples, market participants may use one or more OIS to hedge short-term interest rate movements, to speculate on future interest rate policy, for arbitrage purposes and/or for any other purpose. Generally, OIS may be entered into for short maturities and are traded "over-the-counter" (OTC, e.g., not typically executed on an electronic exchange).

Figure 5B:
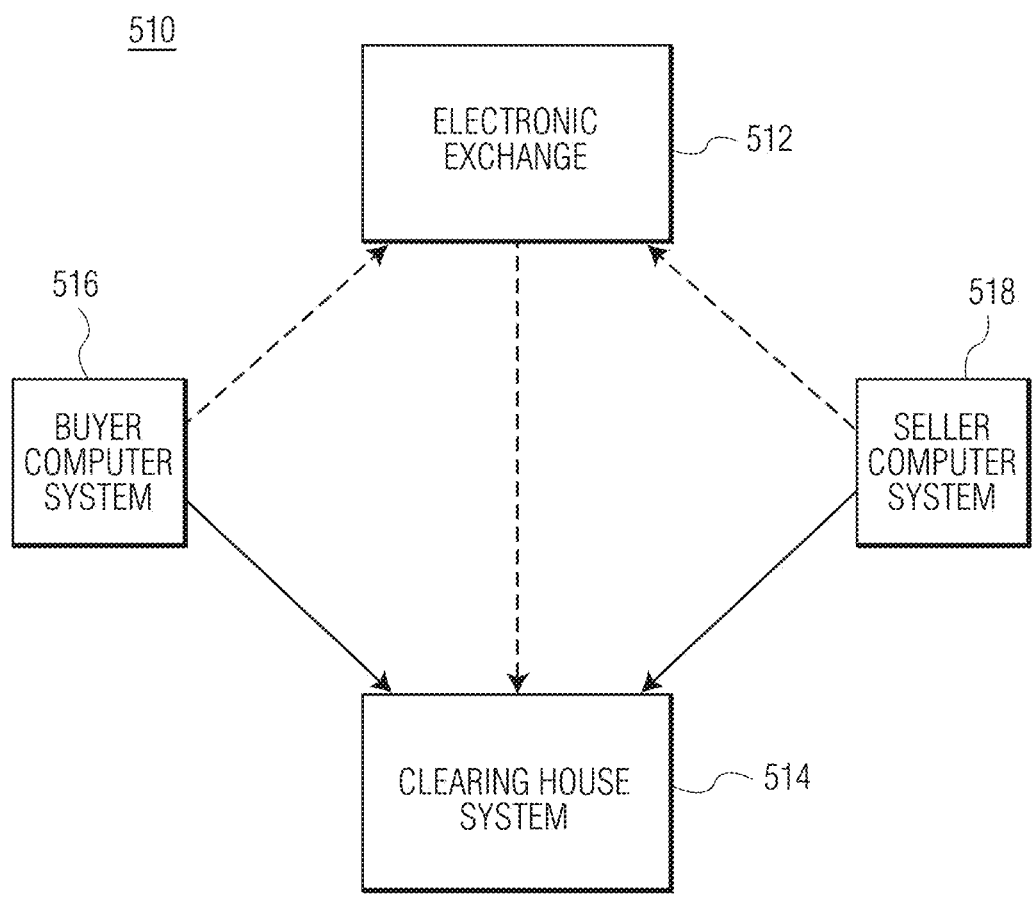
FIG. 5B is a functional block diagram of an example futures transaction system, according to an aspect of the present disclosure.

Referring next to FIG. 5B, a functional block diagram of example futures transaction system 510 for performing one or more futures contract transactions is shown. System 510 may include electronic exchange 512, clearing house system 514, at least one buyer computer system 516 and at least one seller computer system 518. In system 510, one or more futures contracts between buyer computer system(s) 516 and seller computer system(s) 518 may be entered into via electronic exchange 512 (which may include an anonymized central limit order book), and may be centrally cleared via clearing house system 514 (e.g., that may perform central counterparty intermediation). In some examples, futures contracts transactions performed by system 510 may include interest rate futures that are exchange-traded, cleared derivative contracts. In some examples, the price of a futures contract may vary as expectations regarding the future value of the underlying reference floating interest rate change (e.g., a simple average RFR, discussed further below). Futures contracts may be transacted in notional units and have a fixed maturity date. Participants (e.g., buyer computer system(s) 516 and seller computer system(s) 518) may buy and/or sell the contracts on any business day.

For example, a participant may enter a one month currency-specific overnight rate index futures contract at the prevailing market price on a given day, which would have a delivery price at maturity equal to 100 minus the simple monthly average overnight rate.

In some examples, interest rate futures on overnight rates, such as RFRs, may be used to hedge against short-term interest rate movements, for speculation, for arbitrage and/or for any other suitable purpose.

Various potential mechanisms may be used to source price data for complex instruments/transactions (e.g., derivatives) referencing RFRs. The obtained prices may then be used to calculate expected average rates, for example, for one or more particular tenors. Non-limiting examples of data sources from which pricing data may be obtained may include transaction data, settlement price data, firm quotes and/or a hybrid combination of data sources.

For example, executed transaction data may be used for OIS and/or futures contracts referencing RFRs sourced from at least one of central counterparties, trade repositories and/or the trading venues themselves. In some examples, prices from the executed transaction data may be used in combination with at least one financial model to generate yield curves for one or more particular tenors (e.g., one month, three months, six months). For example, the financial model(s) may be used together with the executed transaction data because transaction maturities may not align exactly with the term rates of market participants.

In general, the feasibility of using executed transaction data may depend on the development of liquid and robust underlying derivatives markets to provide sufficient price data to generate the relevant yield curves. In addition, for the transaction data to be useful in the determination of forward-looking term rates, it is desirable for pricing data to be made available on a timely basis (in order to compute the rate(s) in an efficient and accurate manner, e.g., without relying on stale, out-of-date information). Furthermore, it is desirable for the financial model(s) of the present disclosure to be transparent and verifiable (e.g., by users and/or the regulatory community).

In some examples, firm, tradable quotes or indicative quotes from one or more market makers or settlement prices from one or more exchanges may also be obtained for OIS and/or futures contracts referencing RFRs, sourced from trading venues (or, in some examples, from broker/dealer networks or other suitable data providers). The feasibility of using firm quotes, indicative quotes and settlement prices may depend on the development of liquid, robust and transparent underlying derivatives markets. Incorporation of firm quotes, indicative quotes and settlement prices may broaden the data set substantially when compared with using only transaction data. However, in this approach, it is desirable that consideration be given to maintaining the usefulness of the rate and the robustness of the underlying data. For the firm quote, indicative quote and settlement price data to be useful in the determination of forward-looking term rates, it is also desirable that the quotes and prices be made available on a timely basis, and that any financial model be transparent and verifiable.

In addition to electronic trading venues, firm quotes and prices may also be obtained, for example, from a point-in-time electronic auction process for OIS trades in order to generate a term rate. Such an electronic auction process would desirably include sufficient interest to generate a representative price.

In some examples, a hybrid of the above approaches may be used to determine term RFRs. For example, a hybrid approach may include executed transaction data alongside firm quotes, or settlement prices. A hybrid approach may theoretically widen the data set relative to a methodology based solely on transaction data, while retaining high levels of price transparency and representativeness of the rate. The above-mentioned considerations of timeliness, verifiability and transparency may apply regarding term RFRs constructed from transaction data and quotes, and/or settlement prices.

In all example approaches, the management and scope for oversight of both the data input process and the process of determining term RFRs may be considered when selecting a suitable approach. The opportunities for data/system manipulation to arise may also be assessed and prevented by the system of the present disclosure.

In some examples, it may also be desirable that any forward-looking term rate should seek to indicate the market's expectation of the average overnight rate over a pre-determined time period. Market participant systems may then use these term rates to calculate upcoming contractual payments linked to such rates (e.g., interest payments) in advance of the relevant accrual period.

In some examples, forward-looking term rates may be determined from overnight index swaps and/or index futures. In the examples below, the feasibility of determining forward-looking term rates, via the system described herein, as derived from a sterling market-based overnight rate from overnight index swaps and index futures is described. In general, the determination of forward-looking term rates may be applied to one or more suitable RFRs associated with one or more currencies, including, without not limited to, sterling, US dollar, Japanese yen, Swiss franc and euro currencies.

For example, a sterling-based overnight rate OTC OIS market may be episodic in nature. Trading in sterling-based overnight rate OIS contracts, for example, may tend to be focused around Monetary Policy Committee (MPC) meetings and other dates (e.g., where public statements or information releases may impact interest rate expectations). Trading in the sterling-based RFR OIS may be spread, for example, across a range of tenors with the majority of contracts maturing within about six months. Sterling-based overnight rate OIS may generally be forward-starting in order to coincide with MPC meeting and quarterly International Monetary Market (IMM) dates (e.g., accruals may start on a future date, not at the time the OIS contract is entered into). In some examples, DF system 102 may be configured to derive forward-looking term rates for sterling-based overnight rate OIS contracts (e.g., dependent upon price transparency and liquidity of the OIS data).

Figure 6A:
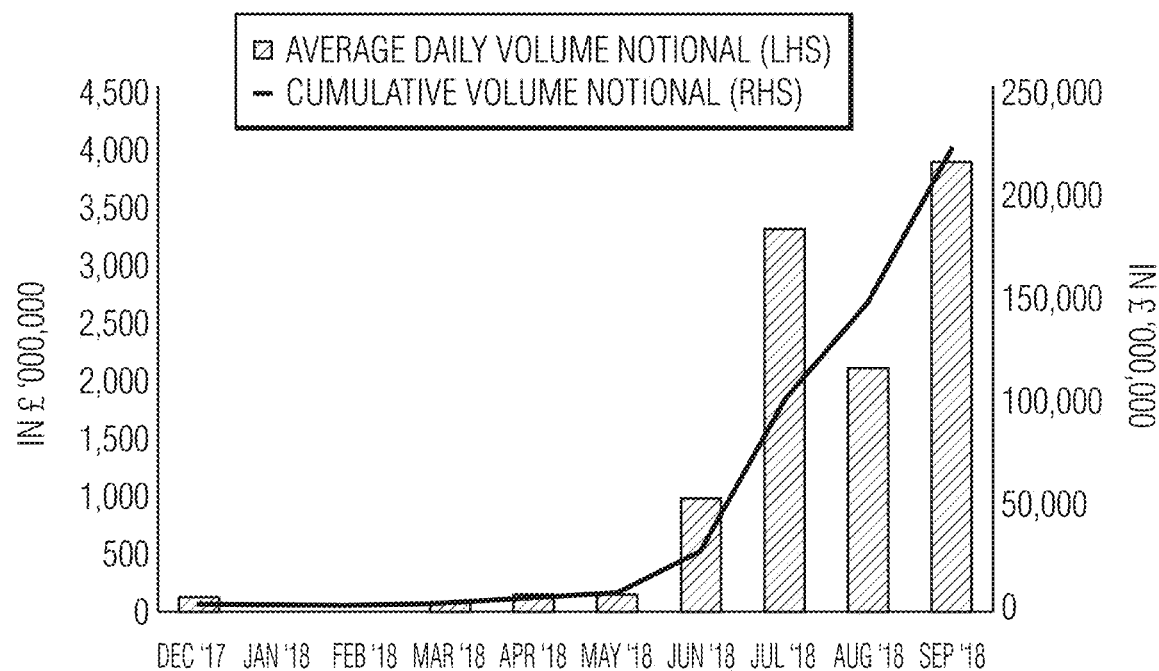
FIG. 6A is graph illustrating an example overnight rate for index futures notional volume over a time period, according to an aspect of the present disclosure.
Figure 6B:
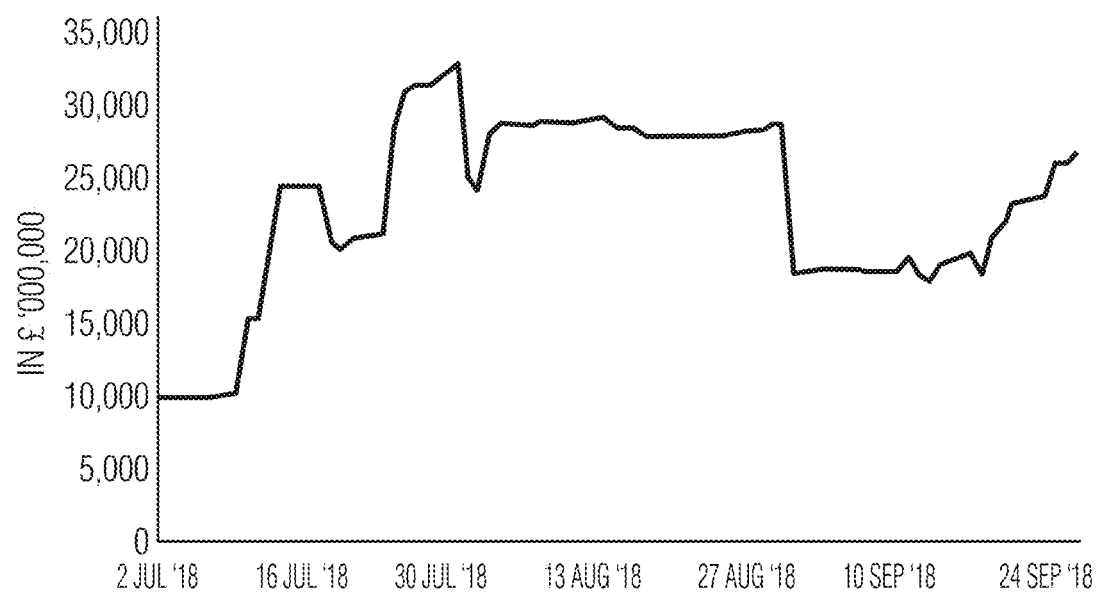
FIG. 6B is graph illustrating an example overnight rate for index futures open interest notional over a time period, according to an aspect of the present disclosure.

In contrast to the sterling-based term overnight rate OIS market, the sterling RFR (e.g., SONIA) futures markets may have less/lower, but increasing liquidity and cumulative volumes. Sec for example, FIGS. 6A and 6B. FIG. 6A is a graph illustrating an index futures notional volume over a time period for a sterling-based overnight rate associated with a one month tenor. FIG. 6B is a graph illustrating an index futures open interest notional over a time period for the sterling-based overnight rate associated with the one month tenor.

Although the sterling-based overnight rate index futures market is at a relatively early stage of development, the market may provide accessibility and price transparency. Futures contracts may trade every business day and may have settlement prices that are published at the end of the day and made widely available. In addition, the availability of a one month index futures contract and associated prices provides more granular information from which to derive the term RFR compared, for example, to three month futures contracts or longer dated forward-starting OIS contracts. A different one month overnight rate index future may cover each of the eight MPC meeting dates that are scheduled to take place each year (or any other particular dates, period, events, etc.), providing further suitable market information on interest rate policy expectations.

As a result, index futures settlement prices, together with published overnight rates, may provide sufficient data to generate a robust and representative implied yield curve on a daily basis. From this yield curve, preliminary one, three and six month forward-looking term rates (for example) may be determined/disseminated periodically, (e.g., every day). In some examples, a term RFR may be produced from intra-day trading activity data. In one example, a term RFR may be derived based on data from morning trading activity in overnight rate index futures contracts and the derived rates may be generated/disseminated later that same morning in the particular time zone associated with the currency area (e.g., in London when the overnight rate is sterling-based). In some examples, a term RFR may be produced from overnight index swap data.

Referring next to FIG. 4, and DTP algorithm 126, an example data structure management method for projecting data trends including forward-looking term interest rate(s) is shown, in accordance with an exemplary embodiment of the present disclosure.

Before describing the determination of forward-looking term interest rates, a brief discussion of terminology associated with several definitions regarding backward-looking realized interest rates is provided. For purposes of this disclosure, backward-looking rates refer to realized averages (simple or compounded) of a set of published historical rates. Specifically, a brief discussion of a simple average rate and a compounded rate are provided.

A simple average rate may be determined by, first, calculating the start and end dates for a tenor. For example, for the n month tenor, the end date may be the publication date, and the start date may be the day n months before the publication date. In some examples, a modified following business day convention may be used, such that the start date and the end date may both always be business days.

Next, the average overnight (ON) rate over the period (based on the start/end dates) may be calculated as:

$$\sum_{i=1}^{n} \frac{r_i}{n}$$

where n is the number of calendar days from (and including) the start date to (but excluding) the end date and $r_i$ is the ON rate in effect on day i. If i is a business day, this will be the ON rate in respect of that day; otherwise it will be the rate in respect of the previous business day.

A compounded rate may be determined by, first, calculating the start and end dates for the tenor, in the same manner as above, for the simple average rate.

The compounded rate may be defined as:

$$\left[\prod_{i=1}^{d}\left(1 + \frac{r_i \cdot a_i}{b}\right) - 1\right] \cdot \frac{b}{n}$$

where n is the number of calendar days from (and including) the start date to (but excluding) the end date, d is the number of business days in the same period, b is the day count fraction denominator basis for the currency (e.g., 365 for Sterling); $r_i$ is the ON rate in respect of day i and $a_i$ is the number of calendar days on which rate $r_i$ is in effect.

Next, forward-looking term rates and method steps of DTP algorithm 126 (FIG. 1) are described. For purposes of this disclosure, the term forward-looking rates refers to mathematical projection(s) of expected compounded future (currency-specific) overnight (ON) rates over a given tenor period, using a customized model, based on a number of inputs which may offer an indication of the market's expectation of future overnight rate settings. In one example, the forward-looking term rate(s) may be determined from one or more futures contracts, such as, without being limited to, short-term interest rate (STIR) futures contracts, including cash-settled STIR futures contracts. In some examples, the futures contracts may reflect average overnight funding rates in one or more markets. In another example, forward-looking term rate(s) may be determined from one or more overnight index swap contracts. In some examples, market surveillance (e.g., by data verifier 122) may be conducted, for example, on data inputs post publication, and the data obtained from the market surveillance may be used to determine one or more term RFRs (as described below).

Figure 7:
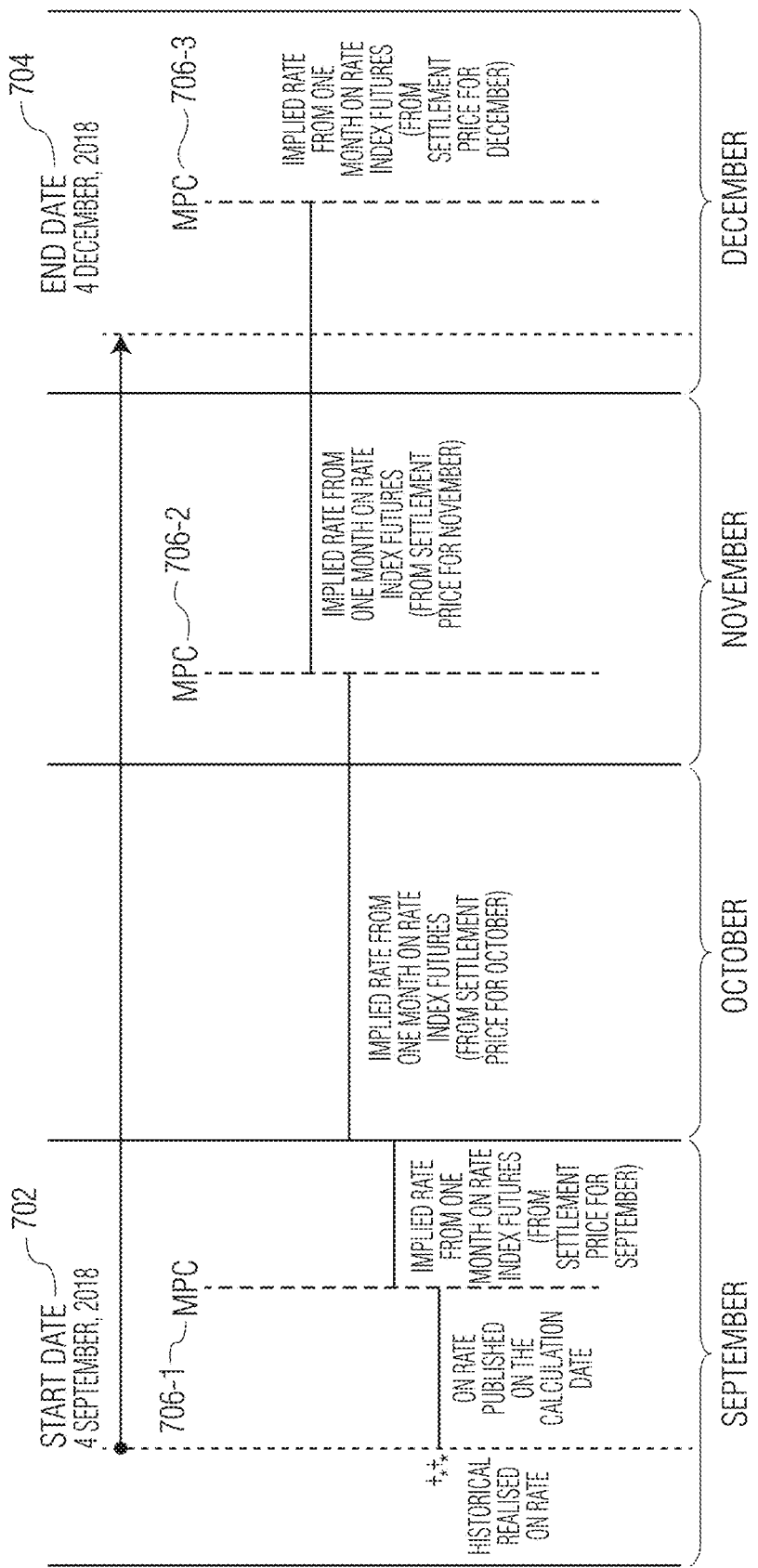
FIG. 7 is a diagram illustrating an example timeline for deriving a forward-looking term interest rate, according to an aspect of the present disclosure.

With reference to FIG. 4 and FIG. 7, a method for projecting data trends including one or more implied term rates is described. FIG. 7 is a diagram illustrating an example timeline for deriving an implied term rate, according to an aspect of the present disclosure.

In general, DTP algorithm 126 of data metric/trend model 124 may determine start and end dates for a predefined time period (at step 400). For example, as shown in FIG. 7, DTP algorithm 126 may identify start date 702 and end date 704 over a timeline spanning three months. DTP algorithm 126 may also identify and select relevant risk free rate data (at step 402) and relevant futures contracts (at step 404) to use (e.g., based on verified (and integrated data obtained from among data source(s) 104). The risk free rate data (step 402) may include at least one currency-specific ON rate data. DTP algorithm 126 may use a calendar of scheduled rate change dates to derive a schedule of implied rate changes between the start date and the end date for the relevant term period (at step 406). In some examples, the modelled rate changes may occur once a month (e.g., either on a scheduled policy rate announcement date, or if there is no such date that month, on the first available business day of the month). For example, FIG. 7 illustrates three scheduled rate change dates 706-1, 706-2, 706-3, as well as an additional rate change date on the first business day of the month (i.e., a total of four rate change dates). The rate to apply at each rate change date may be implied, by DTP algorithm 126 (at step 408), from appropriate futures settlement (or other) price data (e.g., from among data source(s) 104) and published risk free interest rate data (e.g., from among data source(s) 104).

Having determined the future rate change dates and the rates to apply on and from such dates, DTP algorithm 126 may calculate the derived rate (at step 410) by daily compounding across the term, using a similar compounding approach as for the backward-looking compound rate as:

$$\left[\prod_{i=1}^{d}\left(1+\frac{r_i \cdot a_i}{b}\right)-1\right] \cdot \frac{b}{n}$$

where n is the number of calendar days from (and including) the start date to (but excluding) the end date, d is the number of business days in the same period, b is the day count fraction denominator basis for the currency (e.g., 365 for Sterling); $r_i$ is the ON rate in respect of day i and and $a_i$ is the number of calendar days in respect of which rate $r_i$ applies.

At step 412, the forward-looking term setting (determined at step 410) may be published, for example, on website portal 136 (FIG. 1). In some examples, the term setting may be published shortly after it is determined. In some examples, the term setting may be subjected to quality control checks and/or verification (e.g., by data distributer 128) prior to publication. In some examples, the term setting may be published for one or more tenors (e.g., one month, three month, and six month tenor periods).

Next, a non-limiting example embodiment of DTP algorithm 126 is described. At step 400, DTP algorithm 126 of data metric/trend model 124 may determine start and end dates for the relevant term period. For examples, for the (n) month tenor, the start date may be the publication date, and the end date may be the date (n) months after the publication date (using a modified following business day convention such that both the start and end dates are business days). At step 402, algorithm 126 may identify and select relevant risk free rate data and, at step 404, algorithm 126 may identify and select relevant futures contracts.

At step 406, algorithm 126 of data metric/trend model 124 may determine a schedule of rate change dates. For example, the rate change dates may be determined from scheduled central bank meeting dates received from among data source(s) 104. In one example, the schedule may contain exactly one rate change date for each calendar month spanned by the tenor, including the months containing start and end dates. In one example, for the calendar month containing the start date, the rate change date for that month may be either: the scheduled central bank meeting date for that month, provided this occurs on or after the start date; or the start date, where this falls after the scheduled central bank meeting date for that month or there is no scheduled central bank meeting date scheduled for that month. For subsequent calendar months (including the month containing the end date), the rate change date for that month may be either: the scheduled central bank meeting date for that month; or the first business day of that month, where there is no scheduled central bank meeting date for that month. Note that, for the month containing the end date, the rate change date might fall after the end date.

At step 408, DTP algorithm 126 of data metric/trend model 124 may (among other steps) imply rates for the period from futures prices (404) and risk free rate data (402). More generally, at step 408, DTP algorithm 126 may, for each month in turn, determine an initial rate and a new rate to apply at the rate change date.

Step 408 may include, for each calendar month spanned by the tenor, determining the initial rate to apply for each calendar day (if any) prior to the rate change date for that month and the new rate to apply to each calendar day from (and including) the rate change date for that month to the end of that month.

Step 408 may further include, for the month containing the start date, using the risk free interest rate published in respect of the business day preceding the start date (which is published on the start date) as the initial rate. For each subsequent calendar month, the initial rate may be the new rate calculated for the rate change date for the previous month (note that, where the rate change date for a month is the first day of the month, the new rate may apply on and from the first day of the month).

To derive the new rate for each rate change date: step 408 may calculate the sum of the daily interest rates in respect of each calendar day in the month from the start of the month up to (but excluding) the rate change date. For the calendar month containing the start date, for each calendar day (if any) up to (but excluding) the start date, step 408 may use the risk free interest rate published in respect of such day. For a business day, this may be the risk free interest rate published in respect of that day; otherwise it may be the risk free interest rate published in respect of the preceding business day. For each calendar day from (and including) the start date up to (but excluding) the first rate change date (if this is different to the start date), step 408 may use the risk free interest rate published in respect of the business day preceding the start date (i.e. the risk free interest rate published on the start date). For subsequent months, for each calendar day up to (but excluding) the rate change date may use the rate calculated for the rate change date for the previous month.

Step 408 may further include implying a sum of interest rates for the whole month from futures settlement price data published at the end of trading on the preceding business day (e.g., obtained from among data source(s) 104). In some examples, the futures settlement price data may represent a simple average of rates for the particular calendar month. Next, the sum of rates for the calendar days up to (but excluding) the rate change date may be subtracted from the implied sum for the whole month, to determine a sum of rates for the days from (and including) the rate change to (and including) the last calendar day of the month. Next, the sum of rates from (and including) the rate change may be divided by the number of calendar days from (and including) the rate change to obtain the new rate that may apply from (and including) the rate change date.

At step 410, DTP algorithm 126 of data metric/trend model 124 may compound the rates for each business day during the tenor date range, to derive the forward-looking term interest rate setting, using a similar compounding approach as for the backward-looking compound rate, e.g.:

$$\left[\prod_{i=1}^{d}\left(1 + \frac{r_i \cdot a_i}{b}\right) - 1\right] \cdot \frac{b}{n}$$

where n is the number of calendar days from (and including) the start date to (but excluding) the end date, d is the number of business days in the same period, b is the day count fraction denominator basis for the currency (e.g., 365 for Sterling); $r_i$ is the implied rate in respect of day i and and $a_i$ is the number of calendar days in respect of which rate $r_i$ applies.

At step 412, the forward-looking term setting may be published, for example on dedicated website portal 136 (FIG. 1).

In one non-limiting example, relevant published overnight rates, one month published index futures settlement prices and a methodology for identifying the MPC meeting or other dates/events that might result in rate changes over the relevant period may be used in order to imply projected overnight rates over a one, three and six month time period. These implied rates may then be compounded over the relevant period to determine the applicable term overnight rate (the term RFR). The term RFR may, in some examples, be transmitted or published for one, three and six month tenors on a daily basis.

In some examples, to derive and publish the term rates (the forward term RFR), DTP algorithm 126 may perform a combination of the following operations:
1. Identify the following inputs:
   a. the relevant overnight rates (i.e., the overnight rate published on the date the term rate is being derived and historical overnight rates from the beginning of the month);
   b. the one month index futures contracts maturing within each calendar month spanned by the relevant tenor period, and their associated settlement prices from the end of trading on the preceding trading day; and
   c. the MPC meeting dates scheduled to fall during the tenors of the relevant futures contracts required to derive the term rate,
2. Calculate the rate using a step function model by:
   a. determining, from the published overnight rate data and the futures settlement prices, the implied average daily overnight rates from the day the term rate is being derived until the end of the last calendar month spanned by the relevant tenor period, ascribing implied rate changes for each month to the relevant scheduled MPC meeting date (or the first business day of the month where there is no scheduled MPC meeting); and
   b. compounding the implied average daily rates for the overnight rate over the relevant tenor period to produce the term rate, and
3. Publish the term rate on a dedicated website portal (e.g., website portal 136 (FIG. 1) shortly after it is calculated, subject to quality control checks and verification.

In some examples, a modified following business day convention may be used to calculate the term rates.

Figure 8A:
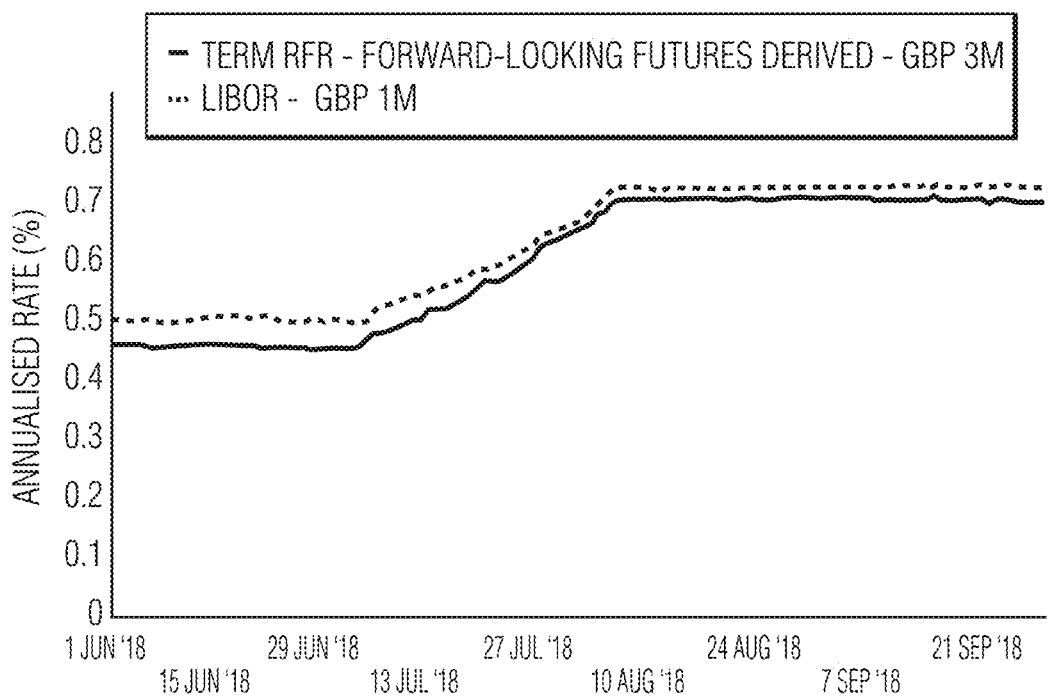
FIGS. 8A, 8B and 8C are graphs of derived forward-looking term risk free rates for various tenors and corresponding term benchmark interest rates, according to an aspect of the present disclosure.
Figure 8B:
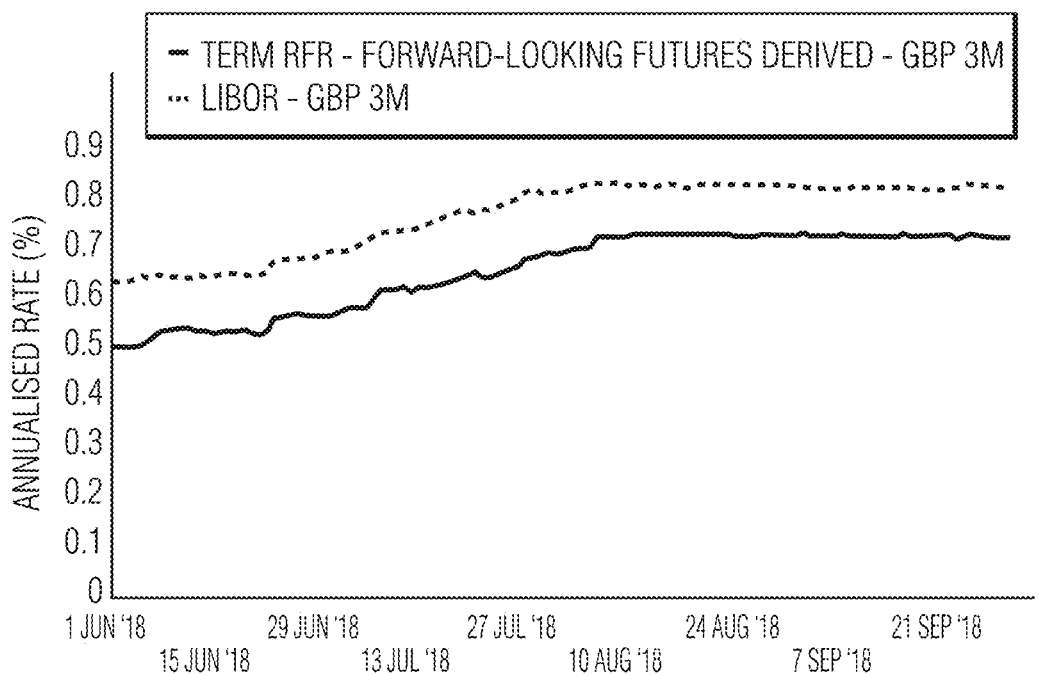
Figure 8C:
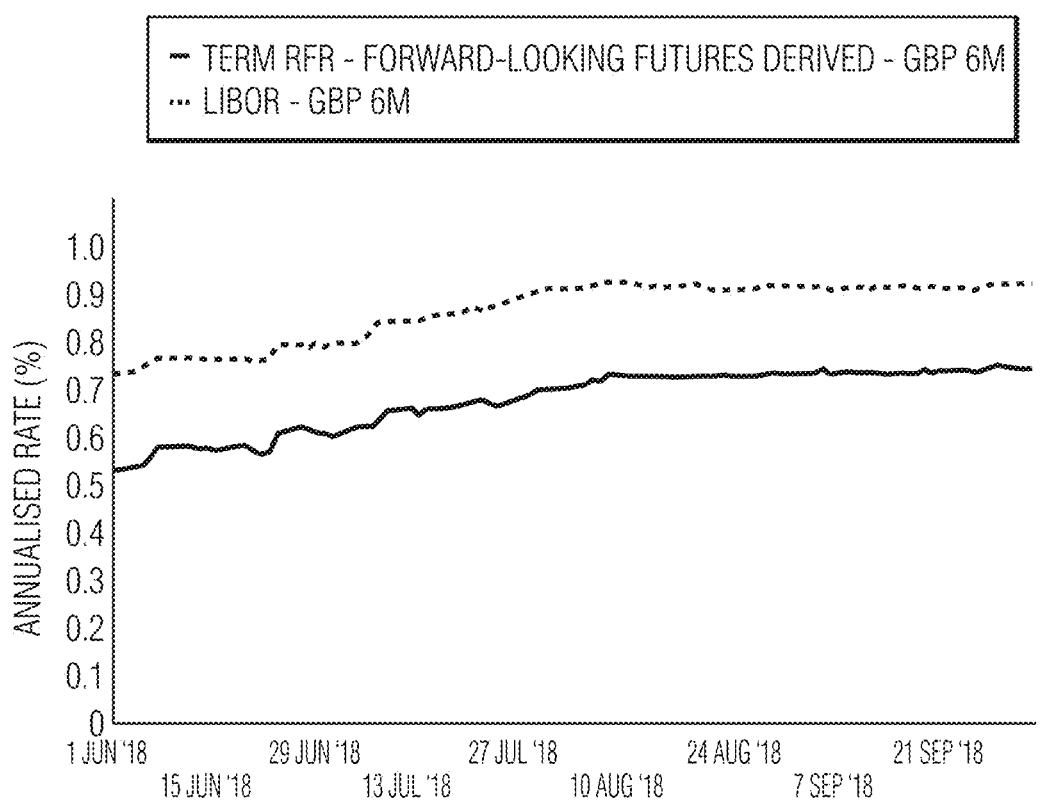

Referring next to FIGS. 8A-8C, example results of historical testing of forward-looking term RFRs derived from futures contracts are described according to the present disclosure. In particular, FIGS. 8A-8C are graphs of forward-looking term RFRs derived for a sterling-based overnight rate for various tenors backtested against corresponding term benchmark interest rates. FIGS. 8A-8C illustrate a comparison of the forward-looking term RFRs with respect to the term benchmark interest rates, according to an aspect of the present disclosure.

FIG. 8A shows an exemplary forward-looking term RFR for a one month tenor over the period of 1 Jun. 2018-26 Sep. 2018 with respect to the one month sterling LIBOR (e.g., a historical benchmark). FIG. 8B shows an exemplary forward-looking term RFR for a three month tenor over the period of 1 Jun. 2018-26 Sep. 2018 with respect to the three month sterling LIBOR. FIG. 8C shows an exemplary forward-looking term RFR for a six month tenor over the period of 1 Jun. 2018-26 Sep. 2018 with respect to the six month sterling LIBOR (benchmark). As shown in FIGS. 8A-8C, the forward-looking term RFRs appear to have a good correlation with the term benchmark interest rates for each of the tenors.

Next, an example forward-looking term risk free rate (RFR) calculation is illustrated, for 8 Jun. 2018, for a three (3) month tenor. In this example, the start date is 8 Jun. 2018 and the end date is three (3) months following the start date. Following the modified following business day convention, the end date in this example is 10 Sep. 2018.

In this example time period, there may be scheduled MPC meeting dates on 21 Jun. 2018, 2 Aug. 2018 and 13 Sep. 2018.

The dates in the relevant months when a rate change date occurs are:
   21 Jun. 2018 (scheduled MPC meeting date)
   2 Jul. 2018 (first business day of month, as there is no scheduled MPC meeting date in July)
   2 Aug. 2018 (scheduled MPC meeting date)
   13 Sep. 2018 (scheduled MPC meeting date)

The rates implied for the relevant period by one month ON rate-based index futures settlement prices on 7 Jun. 2018, are:
   June: 99.545, implying a rate of 0.455 and a whole month sum of 30×0.455=13.65

July: 99.535, implying a rate of 0.465 and a whole month sum of 31×0.465=14.415.

August: 99.395, implying a rate of 0.605 and a whole month sum of 31×0.605=18.755

September: 99.395, implying a rate of 0.605 and a whole month sum of 30×0.605=18.15

Table 1 illustrates the June calculation, with overnight rates for dates prior to the first rate change date being shown.

TABLE 1

Example June Calculations

| Date | ON Rate | Number of days rate is applicable | Weighted Rate |
|---|---|---|---|
| Realized Rates | | | |
| Fri 1 Jun. 2018 | 0.4544 | 3 | 1.3632 |
| Mon 4 Jun. 2018 | 0.4522 | 1 | 0.4522 |
| Tue 5 Jun. 2018 | 0.4525 | 1 | 0.4525 |
| Wed 6 Jun. 2018 | 0.4519 | 1 | 0.4519 |
| Thu 7 Jun. 2018 | 0.4531 | 1 | 0.4531 |
| Projected Rates | | | |
| Fri 8 Jun. 2018 | 0.4531 | 3 | 1.3593 |
| Mon 11 Jun. 2018 | 0.4531 | 1 | 0.4531 |
| Tue 12 Jun. 2018 | 0.4531 | 1 | 0.4531 |
| Wed 13 Jun. 2018 | 0.4531 | 1 | 0.4531 |
| Thu 14 Jun. 2018 | 0.4531 | 1 | 0.4531 |
| Fri 15 Jun. 2018 | 0.4531 | 3 | 1.3593 |
| Mon 18 Jun. 2018 | 0.4531 | 1 | 0.4531 |
| Tue 19 Jun. 2018 | 0.4531 | 1 | 0.4531 |
| Wed 20 Jun. 2018 | 0.4531 | 1 | 0.4531 |
| | | Sum of weighted rates: | 9.0632 |

The sum of rates (9.0632) may be subtracted from the whole month implied sum of 13.65 to obtain an implied aggregated rate for the 10 remaining days of June of 4.5868. Dividing 4.5868 (the implied rate for the 10 remaining days of June) by the number of remaining days (10) gives a daily implied rate from (and including) 21 Jun. 2018 of 0.45868.

For the July calculation, the last calculated rate for the prior month's rate change date of 0.45868 may be used, and the sum of rates up to (but excluding) the rate change date (2 Jul. 2018) may be determined as: 1×0.45868=0.45868. This sum of rates (0.45868) may be subtracted from the whole month implied sum of 14.415 to give an implied aggregated rate for the 30 remaining days of July of 13.95632. This number (13.95632) may be divided by the number of remaining days (30), to obtain a daily implied rate from (and including) 2 Jul. 2018 of 0.46521.

For the August calculation, the last calculated rate for the prior month's rate change date of 0.46521 may be used, and the sum of rates up to (but excluding) the rate change date (2 Aug. 2018) may be determined as: 1×0.46521=0.46521. This sum of rates (0.46521) may be subtracted the whole month implied sum of 18.755 to give an implied aggregated rate for the 30 remaining days of August of 18.28979. This number (18.28979) may be divided by the number of remaining days (30), to obtain a daily implied rate from (and including) 2 Aug. 2018 of 0.60966.

For the September calculation, there is no need to calculate a new rate for the scheduled MPC meeting date of 13 Sep. 2018. This is because this meeting date is after the end of the three month tenor period. The rate for the prior month's rate change date of 0.60966 will continue to be used for the 9 calendar days in September up to (but excluding) the end date.

The above calculations provide the following implied rates, shown in Table 2, that may apply through the three month term.

TABLE 2

Implied Rates for the Rate Change Dates

| Period | Implied Rate |
|---|---|
| From 8 Jun. to 20 Jun., 2018 | 0.4531 |
| From 21 Jun. to 1 Jul., 2018 | 0.45868 |
| From 2 Jul. to 1 Aug., 2018 | 0.46521 |
| From 2 Aug. to 9 Sep., 2018 | 0.60966 |

Daily compounding of these rates during the relevant period produces an overall forward term RFR of 0.5230%.

In some example embodiments, data metric/trend model 124 of DF system 102 (FIG. 1) may derive one or more forward-looking term RFRs from (verified and integrated) futures contract data. In other example embodiments, DF system 102 may be configured to derive forward-looking term RFRs from OIS contract data received from among data source(s) 104.

In an embodiment, DF system 102 may be configured to derive and publish one or more forward term RFRs derived from overnight rate-based OIS prices and quotes and/or futures trading data as follows:

1. Data verifier 122 may obtain multiple complete central limit order books (e.g., tradable bids and offers for the relevant overnight rate OIS or futures data), for example, by monitoring data source(s) 104 (e.g., via data source monitor 202) such as regulated electronic trading platforms for a time window shortly before publication. Data verifier 122 (for example, data verification controller 210) may take a set number of "snapshots" from this data at randomized times;
2. Data verifier 122 (e.g., via data integrator 214) may combine data for each snapshot into a global, synthetic order book (e.g., stored in database 216 or reference database(s) 134), and data verifier 122 may calculate a volume-weighted average mid-price (VWAMP) for that snapshot;
3. Data verifier 122 (e.g., via data verification controller 210) may exclude certain snapshots through integrity testing (e.g., by implementing verification criteria stored in database 212 such as one or more Illiquidity criteria, one or more outlier criteria and/or one or more crossed order book tests);
4. Data metric/trend model 124 may be configured to implement DTP algorithm 126 to derive one or more relevant forward-looking term rates as the quality-weighted (by spread) average of the remaining VWAMPs (e.g., which remaining verified data may be stored in reference database(s) 134); and
5. Data distributor 128 may be configured to transmit, disseminate and/or publish the forward-looking term rate(s) derived for the OIS contract and/or futures trading data, for example, via dedicated website portal 136.

In some examples, forward-looking term RFRs may be derived from transactions or firm quotes or indicative quotes taken during specific time intervals (e.g., instead of using futures settlement prices), based on sufficient liquidity in the overnight rate index futures electronic market, and where there is sufficient price transparency. For example, data may be obtained from the morning of publication (e.g., between 10 am and 11 am). A methodology similar to that described above may be used to compile a series of volume-weighted average mid-point prices from which the forward-looking term RFRs from OIS contracts or futures trading data may be derived.

In some examples, by combining transaction or firm quote or indicative quote data obtained from a broader range of products, including overnight index swaps and futures contracts for one or more time periods (for example, one and three months and futures contracts and OIS) in this manner, may also result in an enhanced methodology. For example, such an approach may provide additional term data and transparency, thereby increasing the availability of the data and the representativeness of the term risk free rate.

Referring next to FIGS. 9A and 9B, a schematic representation of an example dedicated website portal 900 (also referred to herein as RFR portal 900) is shown. RFR portal 900 is an example of dedicated website portal 136 (FIG. 1) that may comprise a specifically configured website comprising one or more webpages for accessing and displaying data associated with one or more term RFRs that are determined/projected via the system of the present disclosure. In some examples, RFR portal 900 may interconnect users to various data sources, pipelines and/or data feeds (not shown in FIGS. 9A and 9B), and provide access to all such sources, together in one location. Information displayed on RFR portal 900 may be updated, for example, in real-time, in near real-time, periodically (for example, on a daily basis, on an intraday basis, etc.), based on one or more predetermined events, etc.

In some examples, RFR portal 900 may include report date selector 902, submission button 904 and at least two sections 906 and 908 providing various information on alternative risk free rates. In operation, selection of a date and input via (date selector 902 and submission button 904) may cause RFR portal 900 to update the displayed webpage to include at least sections 906 and 908 providing alternative risk free rate information for the selected date. In some examples, RFR portal 900 may allow selection of more than one date (for example, on different tabs of RFR portal 900).

Section 906 may be configured to provide one or more published overnight rates (i.e., RFR Benchmark 914) for one or more currencies. Section 908 may include one or more subsections providing additional alternative risk free rate information for one or more currencies. In FIGS. 9A and 9B, four subsections (908-1, 908-2, 908-3, and 908-4) associated with respective currencies GBP, USD, JPY and EUR are shown. It is understood that section 908 may include more or fewer subsections, including one subsection.

Each subsection 908 may provide realized average information 910 for a particular currency-specific overnight rate, and associated with one or more tenors. Realized average information 910 may be derived or projected from historical, published risk free rate data. Realized average information 910 may include simple averages, compounded averages and/or any combination thereof. In some examples, the simple average may represent an arithmetic average of the published RFRs for one or more periods (e.g., one, three and six month periods) prior to the publication date, and where the rates may be derived using published overnight RFRs as inputs. In some examples, the compounded average may represent compounded RFRs for one or more periods (e.g., one, three and six month periods), and where the rates may be derived using published overnight RFRs as inputs.

Each subsection 908 may also provide forward-looking term RFR information 912 for a particular currency-specific overnight rate, and associated with one or more tenors. In some examples, information 912 may include forward term RFRs derived from futures contract data (e.g., one month overnight rate-based index futures settlement price data) and published overnight rate data. In some examples, information 912 may include forward term RFRs derived from overnight rate-based OIS contract and/or futures trading data. In some examples, information 912 may include forward term RFRs derived from both futures contract data and OIS contract data.

The presentation of realized average information 910 may provide users with useful historical rate information, alongside the daily published overnight RFRs (RFR benchmark 914 in section 906) and forward-looking term RFR information 912.

In some examples, term RFR portal 900 may be updated daily at various time intervals, for example, based on the release time of any relevant RFRs and any time windows selected for determining the relevant term RFRs. In some examples, RFR portal 900 may provide same-day publication of all term RFRs in the morning in the time zone of the relevant currency area.

Although exemplary sections are depicted in FIGS. 9A and 9B, alternative configurations for the sections are envisioned. For examples, RFR portal 900 may contain more or fewer sections, webpages and/or tabs. Additionally, the sections may be reorganized in any manner and display any pertinent information.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with data structure management systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 10:
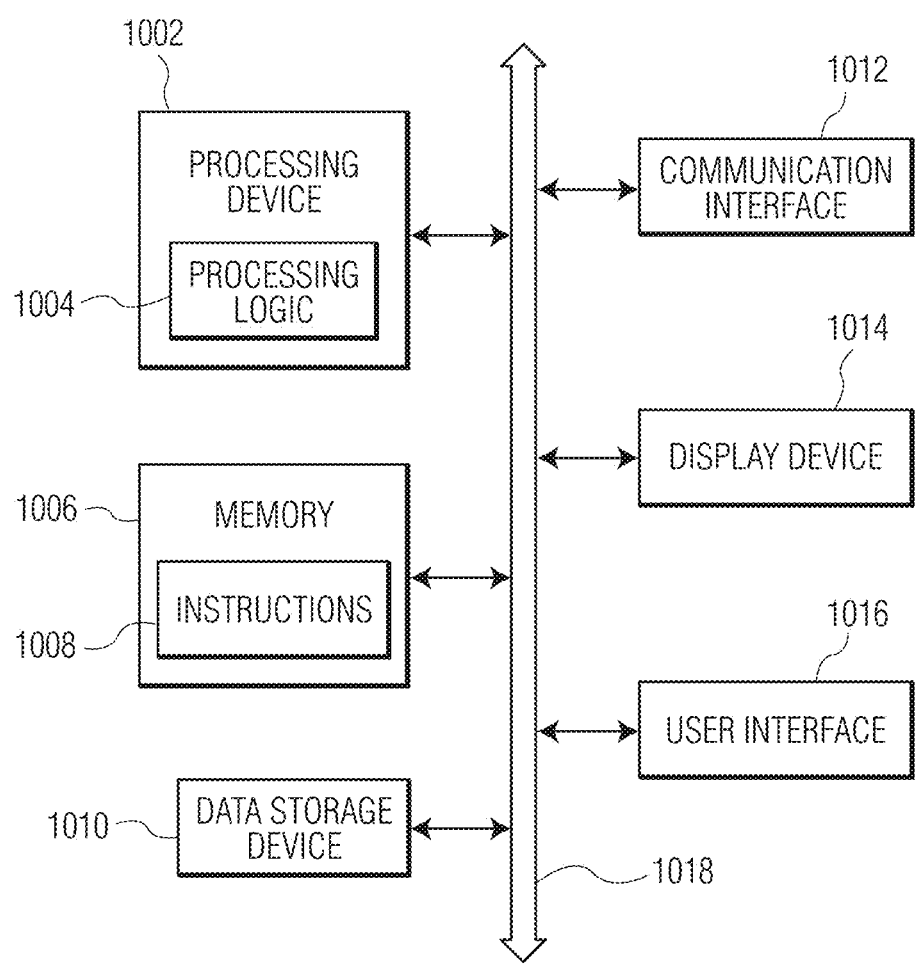
FIG. 10 is a functional block diagram of an example computer system, according to an aspect of the present disclosure.

FIG. 10 illustrates a functional block diagram of a machine in the example form of computer system 1000 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of DF system 102 (data source interface(s) 120, data verifier 122, data metric/trend model 124, data distributer 128, data dissemination interface 130, controller 132 and reference database(s) 134), data source(s) 104 and/or dissemination entity(s) 106 may be implemented by the example machine shown in FIG. 10 (or a combination of two or more of such machines).

Example computer system 1000 may include processing device 1002, memory 1006, data storage device 1010 and communication interface 1012, which may communicate with each other via data and control bus 1018. In some examples, computer system 1000 may also include display device 1014 and/or user interface 1016.

Processing device 1002 may include, without being limited to, a microprocessor, a central processing unit, an application-specific integrated circuit (ASIC), a field programmable gate array (FPGA), a digital signal processor (DSP) and/or a network processor. Processing device 1002 may be configured to execute processing logic 1004 for performing the operations described herein. In general, processing device 1002 may include any suitable special-purpose processing device specially programmed with processing logic 1004 to perform the operations described herein.

Memory 1006 may include, for example, without being limited to, at least one of a read-only memory (ROM), a random access memory (RAM), a flash memory, a dynamic RAM (DRAM) and a static RAM (SRAM), storing computer-readable instructions 1008 executable by processing device 1002. In general, memory 1006 may include any suitable non-transitory computer readable storage medium storing computer-readable instructions 1008 executable by processing device 1002 for performing the operations described herein. For example, computer-readable instructions 1008 may include operations performed by components 120-136 of DF system 102, including operations shown in FIGS. 3 and 4. Although one memory device 1006 is illustrated in FIG. 10, in some examples, computer system 1000 may include two or more memory devices (e.g., dynamic memory and static memory).

Computer system 1000 may include communication interface device 1012, for direct communication with other computers (including wired and/or wireless communication) and/or for communication with a network. In some examples, computer system 1000 may include display device 1014 (e.g., a liquid crystal display (LCD), a touch sensitive display, etc.). In some examples, computer system 1000 may include user interface 1016 (e.g., an alphanumeric input device, a cursor control device, etc.).

In some examples, computer system 1000 may include data storage device 1010 storing instructions (e.g., software) for performing any one or more of the functions described herein. Data storage device 1010 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for projecting one or more trends in electronic data and generating enhanced data, comprising:
a dedicated website portal configured to generate at least one webpage comprising an input selection portion and a projected data portion;
a data forecasting system in electronic communication with one or more electronic data sources and the dedicated website portal via an electronic network, the data forecasting system comprising at least one processor and non-transitory memory storing computer readable instructions, the data forecasting system configured to:
receive, via the input selection portion of the at least one webpage, input comprising a selected time period;
monitor the one or more electronic data sources for data that meet one or more predetermined criteria;
obtain the monitored data from among the one or more electronic data sources by taking one or more snapshots of the monitored data at randomized times;
create a data set from the obtained data;
derive, according to a forward-looking term methodology, one or more data values associated with the data set over the selected time period, the forward-looking term methodology comprising execution of a series of calculations involving the data set, the results of which produce projected data that is predictive of future data value changes over the selected time period, said projected data comprising said derived one or more data values;

utilize the data set and the one or more derived data values over the selected time period to derive at least one data forecast metric associated with the data set; and disseminate the at least one data forecast metric to the dedicated website portal, such that the projected data portion of the at least one webpage is updated to display the at least one data forecast metric reflecting the selected time period, wherein the data forecasting system, as part of the forward-looking term methodology, is further configured to:

exclude one or more among the one or more snapshots via integrity testing, combine remaining snapshots among said one or more snapshots into a global synthetic order book, responsive to said exclude, calculate, for said combined snapshots, one or more statistical values, and apply a predetermined weighting to the one or more statistical values to derive a forward-looking term setting for the selected time period.

2. The system of claim 1, wherein the data set includes a combination of futures price data, overnight index swap price data and rate data.

3. The system of claim 2, wherein the rate data comprises at least one of fixed rate data and floating rate data.

4. The system of claim 1, wherein the forward-looking term methodology, performed by the data forecasting system, is customized according to a type of data included in the data set.

5. The system of claim 1, wherein the data forecasting system is further configured to determine one or more sub-periods within the selected time period and select a portion of the monitored data that is associated with each of the one or more sub-periods, the data set further including the selected portion of the monitored data.

6. The system of claim 5, wherein the data set includes futures price data and risk free rate data, the data forecasting system, as part of the forward-looking term methodology, is further configured to:

identify and select each of relevant risk free rate data and relevant futures price data associated with the selected time period from among the data set, based on predetermined eligibility criteria;

determine, for the futures price data, the one or more sub-periods within the selected time period associated with at least one predicted change in the risk free rate data;

imply, for each of the one or more sub-periods, one or more implied rates based on the selected relevant risk free rate data and the selected relevant futures price data; and compound the one or more implied rates to derive a further forward-looking term setting for the selected time period, the one or more data values comprising the one or more implied rates and the at least one data forecast metric comprising the further forward-looking term setting.

7. The system of claim 6, wherein the risk free rate data includes overnight rate data.

8. The system of claim 1, wherein the one or more electronic data sources include multiple central limit order books, the data forecasting system, as part of the forward-looking term methodology, is further configured to:

take the one or more snapshots of overnight index swap price data from among the multiple central limit order books at the randomized times; and calculate, for said combined snapshots, one or more volume-weighted average mid-price (VWAMP) values, the one or more statistical values comprising the one or more VWAMP values, wherein the predetermined weighting comprises quality weighting the one or more VWAMP values by spread to derive the forward-looking term setting for the selected time period.

9. The system of claim 1, wherein:

the series of calculations executed by the forward-looking term methodology further involves at least one of executed transaction data, firm quote data, indicative quote data, and settlement price data.

10. The system of claim 1, wherein:

the data set includes both overnight index swap price data and futures price data, and the series of calculations executed by the forward-looking term methodology further involves at least one of executed transaction data, firm quote data, indicative quote data, and settlement price data, specific to each of the overnight index swap price data and the futures price data.

11. The system of claim 1, wherein:

when the data set includes futures price data, said futures price data is obtained during predetermined time intervals based on one or more predetermined conditions, specific to said futures price data.

12. The system of claim 1, wherein:

when the data set includes overnight index swap price data, said overnight index swap price data is obtained during predetermined time intervals based on one or more predetermined conditions, specific to said overnight index swap price data.

* * * * *